(12) United States Patent
Yamane et al.

(10) Patent No.: US 7,677,787 B2
(45) Date of Patent: Mar. 16, 2010

(54) INTERMESHING TYPE TWIN SCREW EXTRUDER AND MIXING DEGREE ADJUSTING DEVICE

(75) Inventors: Yasuaki Yamane, Takasago (JP); Shin Hotani, Takasago (JP); Yoshinori Kuroda, Takasago (JP); Koichi Miyake, Takasago (JP); Katsunori Takahashi, Takasago (JP); Taiji Orimo, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 177 days.

(21) Appl. No.: 11/995,045

(22) PCT Filed: Jun. 6, 2006

(86) PCT No.: PCT/JP2006/311273
§ 371 (c)(1),
(2), (4) Date: Jan. 8, 2008

(87) PCT Pub. No.: WO2007/007488
PCT Pub. Date: Jan. 18, 2007

(65) Prior Publication Data
US 2009/0122636 A1    May 14, 2009

(30) Foreign Application Priority Data
Jul. 11, 2005    (JP)    ............................... 2005-202057

(51) Int. Cl.
*B29B 7/48* (2006.01)
(52) U.S. Cl. .......................................... 366/80; 366/85
(58) Field of Classification Search ............. 366/79–80, 366/82–85, 88–90; 425/200–209
See application file for complete search history.

(56) References Cited

U.S. PATENT DOCUMENTS
3,070,836 A * 1/1963 De Haven et al. .......... 264/40.7
(Continued)

FOREIGN PATENT DOCUMENTS
JP    58 87013    5/1983
(Continued)

*Primary Examiner*—Charles E Cooley
(74) *Attorney, Agent, or Firm*—Oblon, Spivak, McClelland, Maier & Neustadt, L.L.P.

(57) ABSTRACT

A mixing degree adjusting device comprises a pair of spacer members arranged at a position sandwiching both round sectional portions of a pair of screws from both sides in the aligning direction of the pair of screws, and a pair of drawing members arranged as a position sandwiching both the round sectional portions from both sides in the orthogonal direction that is orthogonal to the aligning direction. The spacer members are movable between an adjusting position opposing to the round sectional portions, and a retracting position, when the screws are extracted from the barrel, for retracting to the outside until the passage of the screws is accepted. Opposing portions opposing to the round sectional portions at the time of moving to the adjusting position are formed in a substantially linear shape extending in parallel with the orthogonal direction seen from the axial direction of the screws. The drawing members are movable in the direction approaching to and retracting from the round sectional portions along the opposing portions in an area intervening between the opposing portions of both the spacer members at the time of moving to the adjusting position, and when the screws are extracted from the barrel, retractable to the outside until the passage of the screws is accepted.

9 Claims, 15 Drawing Sheets

U.S. PATENT DOCUMENTS

| | | | |
|---|---|---|---|
| 3,360,824 A * | 1/1968 | Schippers | 366/76.92 |
| 3,419,250 A * | 12/1968 | Brennan, Jr. | 366/196 |
| 3,870,285 A * | 3/1975 | Bausch et al. | 366/80 |
| 3,981,658 A * | 9/1976 | Briggs | 425/205 |
| 4,103,355 A * | 7/1978 | Weber | 366/90 |
| 4,136,968 A * | 1/1979 | Todd | 366/85 |
| 4,332,481 A * | 6/1982 | Inoue et al. | 366/84 |
| 4,462,691 A * | 7/1984 | Boguslawski | 366/80 |
| 4,678,339 A * | 7/1987 | Peiffer et al. | 366/76.93 |
| 5,145,251 A * | 9/1992 | Shirato et al. | 366/80 |
| 5,335,991 A * | 8/1994 | Wobbe | 366/79 |
| 5,672,005 A * | 9/1997 | Fukui et al. | 366/75 |
| 5,909,958 A * | 6/1999 | Rauwendaal | 366/76.2 |
| 6,238,079 B1 * | 5/2001 | Watada et al. | 366/80 |
| 6,280,074 B1 * | 8/2001 | Kuroda et al. | 366/76.3 |
| 6,607,299 B1 * | 8/2003 | Bacher et al. | 366/87 |
| 7,004,616 B2 * | 2/2006 | Murakami et al. | 366/75 |
| 2002/0186612 A1 * | 12/2002 | Murakami et al. | 366/79 |
| 2007/0237022 A1 * | 10/2007 | Wiltz et al. | 366/80 |
| 2007/0237850 A1 * | 10/2007 | Wiltz et al. | 425/114 |
| 2009/0175120 A1 * | 7/2009 | Rokey et al. | 366/132 |

FOREIGN PATENT DOCUMENTS

| | | | |
|---|---|---|---|
| JP | 02263609 A * | 10/1990 | |
| JP | 4 28505 | 1/1992 | |
| JP | 04014412 A * | 1/1992 | |
| JP | 04022606 A * | 1/1992 | |
| JP | 04022607 A * | 1/1992 | |
| JP | 04028505 A * | 1/1992 | |
| JP | 4 257414 | 9/1992 | |
| JP | 10 278099 | 10/1998 | |
| JP | 10 305422 | 11/1998 | |
| JP | 10305422 A * | 11/1998 | |
| JP | 11 216762 | 8/1999 | |
| JP | 2000 309017 | 11/2000 | |
| JP | 2000 309018 | 11/2000 | |
| JP | 2000309017 A * | 11/2000 | |
| JP | 2002 28963 | 1/2002 | |
| JP | 2002 321214 | 11/2002 | |
| JP | 2003 33961 | 2/2003 | |

* cited by examiner

AT THE TIME OF ADJUSTING MIXING DEGREE

AT THE TIME OF EXTRACTING SCREW

COMPARATIVE EXAMPLE (CLOSED STATE)

(OPENED STATE)

(AT THE TIME OF EXTRACTING SCREW)

MIXING DEGREE ADJUSTING DEVICE ACCORDING TO THE PRESENT INVENTION (CLOSED STATE)

(OPENED STATE)

(AT THE TIME OF EXTRACTING SCREW)

LENGTH OF ACTION

INTERMESHING TYPE TWIN SCREW EXTRUDER AND MIXING DEGREE ADJUSTING DEVICE

TECHNICAL FIELD

The present invention relates to an intermeshing type twin screw extruder for mixing various resin compounds such as plastic and rubber, and a mixing degree adjusting device used in the intermeshing type twin screw extruder.

BACKGROUND ART

Conventionally, in an intermeshing type twin screw extruder and a twin screw continuous mixing machine, a mixing degree adjusting device for adjusting a cross section of flow route is provided in the middle of an internal flow route so as to adjust flow of an object to be mixed flowing through the machine and to control a mixing degree of the object to be mixed. Specifically, the intermeshing type twin screw extruder has a structure of extracting screws forward at the time of maintenance, and the mixing degree adjusting device is required to have a structure that is in consideration with the extracting of the screws.

The mixing degree adjusting device for adjusting the cross section of flow route includes a slot bar method, a taper ring method and a gate method.

In the slot bar method, two slot bars formed by providing a half arc surface with a curvature that is equal to or slightly larger than a curvature of an inner peripheral surface of a barrel in a round bar are arranged in the middle of a flow route in the machine so as to lie at right angles to axes of two screws and sandwich the screws from the top and the bottom, and by rotating the two slot bars in the different directions from each other, the cross section of flow route is changed so as to adjust the flow rate of the object to be mixed (Patent Documents 1 and 2).

In the taper ring method, a large outer diameter portion, a small outer diameter portion and a screw side taper portion for connecting the outer diameter portions are provided in the middle of the screws, and in the barrel, a large inner diameter portion is provided at a part opposing to the large outer diameter portion, a small inner diameter portion is provided at a part opposing to the small outer diameter portion, and a barrel side taper portion for connecting the inner diameter portions is provided. By moving the barrel side taper portion in the axial direction of the screws, a clearance between the screw side taper portion and the barrel side taper portion is changed so as to adjust the flow rate of the object to be mixed (Patent Documents 3 and 4).

In the gate method, two gate plates having cutouts in an arc shape with a curvature that is substantially equal to a curvature of inner periphery of the barrel or a curvature of outer periphery of a screw axis at edges opposing to each other are arranged in the middle of the flow route in the machine so as to lie at right angles to axes of two screws arranged horizontally and sandwich the screws from the top and the bottom, and by moving the two gate plates upward and downward in the different directions from each other, the cross section of flow route is changed so as to adjust the flow rate of the object to be mixed (Patent Documents 5 and 6).

However, there is the following problem in the mixing degree adjusting devices of the methods mentioned above.

That is, in the mixing degree adjusting device of the slot bar method disclosed in Patent Documents 1 and 2, even at the time of closing action, a flow route is formed between both end parts in the axial direction of the slot bars of the half arc surface and the screw axes, and thus it is not possible to obtain a sufficient drawing effect. It should be noted that the "sufficient drawing effect" means an effect of sufficiently narrowing the cross section of flow route at the time of totally closing with a wide adjusting range of the mixing degree. Meanwhile, when the curvature of the half arc surface of the slot bars is made smaller than the curvature of the inner peripheral surface of the barrel in order to obtain the sufficient drawing effect, it is not easy to extract the slot bars at the time of maintenance, and there is a fear that the mixing degree adjusting device is required to be disassembled for the extracting.

In the mixing degree adjusting device of the taper ring method disclosed in Patent Documents 3 and 4, since the large outer diameter portion or a flight of the screws and the small inner diameter portion of the barrel interfere with each other, there is a problem that the screws cannot be extracted forward without moving the barrel.

In the mixing degree adjusting device of the gate method, when the cutouts of the gate plates have the curvature that is substantially equal to the inner periphery of the barrel, the adjusting range of the mixing degree is narrowed and it is not possible to obtain the sufficient drawing effect. When the cutouts of the gate plates have the curvature that is substantially equal to the curvature of the outer periphery of a land portion formed smaller than a diameter of the screws as disclosed in Patent Document 5 in order to obtain the sufficient drawing effect, at the time of totally opening the gate plates, a hollow generated by housing the edges in an arc shape of the gate plates to the inside of an inner surface of the barrel easily becomes a large dead space (Patent Document 5 and FIG. 3).

When the cutouts of the gate plates have the curvature that is substantially equal to the curvature of the outer periphery of the land portion formed smaller than the diameter of the screws, following the opening of the gate plates, not only a clearance between the gate plates between the two screws but also a clearance between the gate plates on the left and right outer sides of the two screws are increased so that the cross section of flow route is radically changed. Therefore, there is a problem that fine-adjustment of the mixing degree is not easily performed. With regard to the problem of the fine-adjustment of the mixing degree, in the mixing degree adjusting device disclosed in Patent Document 6, left and right end parts of the gate plates extend to the opposing gate plate side, and inclinations in the up and down direction are provided in the extended parts of the gate plates so as to mesh with each other so that the inclined parts are overlapped (meshed) with each other irrespective of an opening degree of the gate plates and the radical change in the cross section of flow route is prevented. However, since the left and right end parts of the gate plates extend in the up and down direction, a moving stroke of the gate plates for extracting the screw axes (action length) becomes large so that in the twin screw extruder provided with the mixing degree adjusting device of Patent Document 2, particularly due to a need for ensuring a space on the lower side, there is a large limitation on installment thereof.

Patent Document 1: Japanese Patent Laid-Open No. 2000-309018

Patent Document 2: Japanese Patent Laid-Open No. 2003-33961

Patent Document 3: Japanese Patent Laid-Open No. Sho58-87013

Patent Document 4: Japanese Patent Laid-Open No. Hei11-216762

Patent Document 5: Japanese Patent Laid-Open No. 2002-28963

Patent Document 6: Japanese Patent Laid-Open No. Hei10-278099

DISCLOSURE OF THE INVENTION

The present invention is achieved in consideration to the problems mentioned above, and it is an object of the present invention to provide a mixing degree adjusting device capable of easily extracting screws from a barrel, and obtaining a sufficient drawing effect.

In order to achieve the object, the following technical means is applied in the present invention. That is, the mixing degree adjusting device according to the present invention is a mixing degree adjusting device for adjusting a mixing degree of an object to be mixed by regulating a flow rate of the object to be mixed that flows along round sectional portions, the mixing degree adjusting device being provided at a position corresponding to the round sectional portions in an intermeshing type twin screw extruder in which a pair of screws provided with the round sectional portions having a diameter that is smaller than an outer diameter of a mixing wing portion on the downstream side of the mixing wing portion for mixing the object to be mixed are aligned within a barrel, comprising a pair of spacer members arranged at a position sandwiching both the round sectional portions from both sides in the aligning direction of the pair of screws, and a pair of drawing members arranged as a position sandwiching both the round sectional portions from both sides in the orthogonal direction that is orthogonal to the aligning direction, the spacer members being movable between an adjusting position for coming into the inside of the outer diameter of the mixing wing portion in the aligning direction and opposing to the round sectional portions, and a retracting position, when the screws are extracted from the barrel, for retracting to the outside until the passage of the screws is accepted, and opposing portions opposing to the round sectional portions at the time of moving to the adjusting position being formed in a substantially linear shape extending substantially in parallel with the orthogonal direction seen from the axial direction of the screws, and the drawing members being formed in a shape in which end parts thereof on the both round sectional portions side are along peripheral surfaces of the round sectional portions, movable in the direction approaching to and retracting from the round sectional portions along the opposing portions in an area intervening between the opposing portions of both the spacer members at the time of moving to the adjusting position, and when the screws are extracted from the barrel, retractable to the outside until the passage of the screws is accepted.

According to the present invention, it is possible to provide the mixing degree adjusting device capable of easily extracting the screws from the barrel, and obtaining the sufficient drawing effect.

BEST MODE FOR CARRYING OUT THE INVENTION

Figure 1:
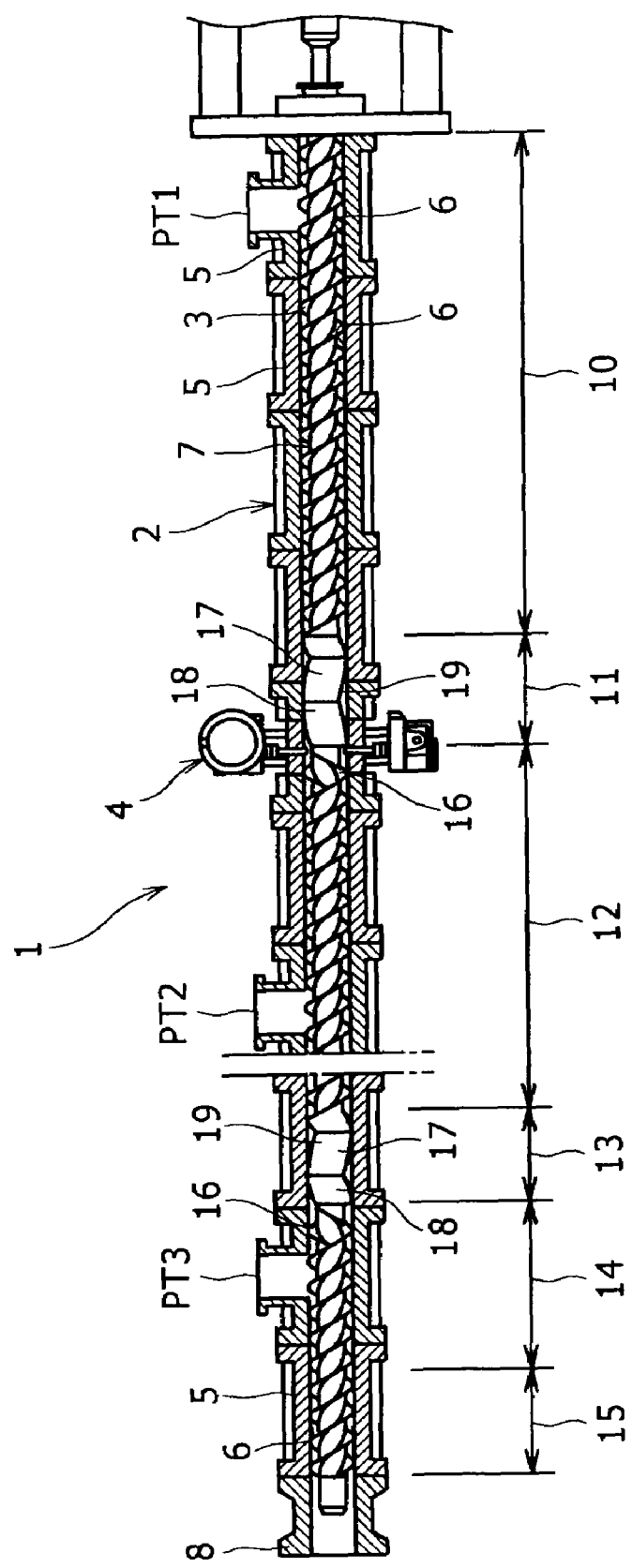
FIG. 1 is a side sectional view of an intermeshing type twin screw extruder provided with a mixing degree adjusting device according to the present invention.
Figure 2:
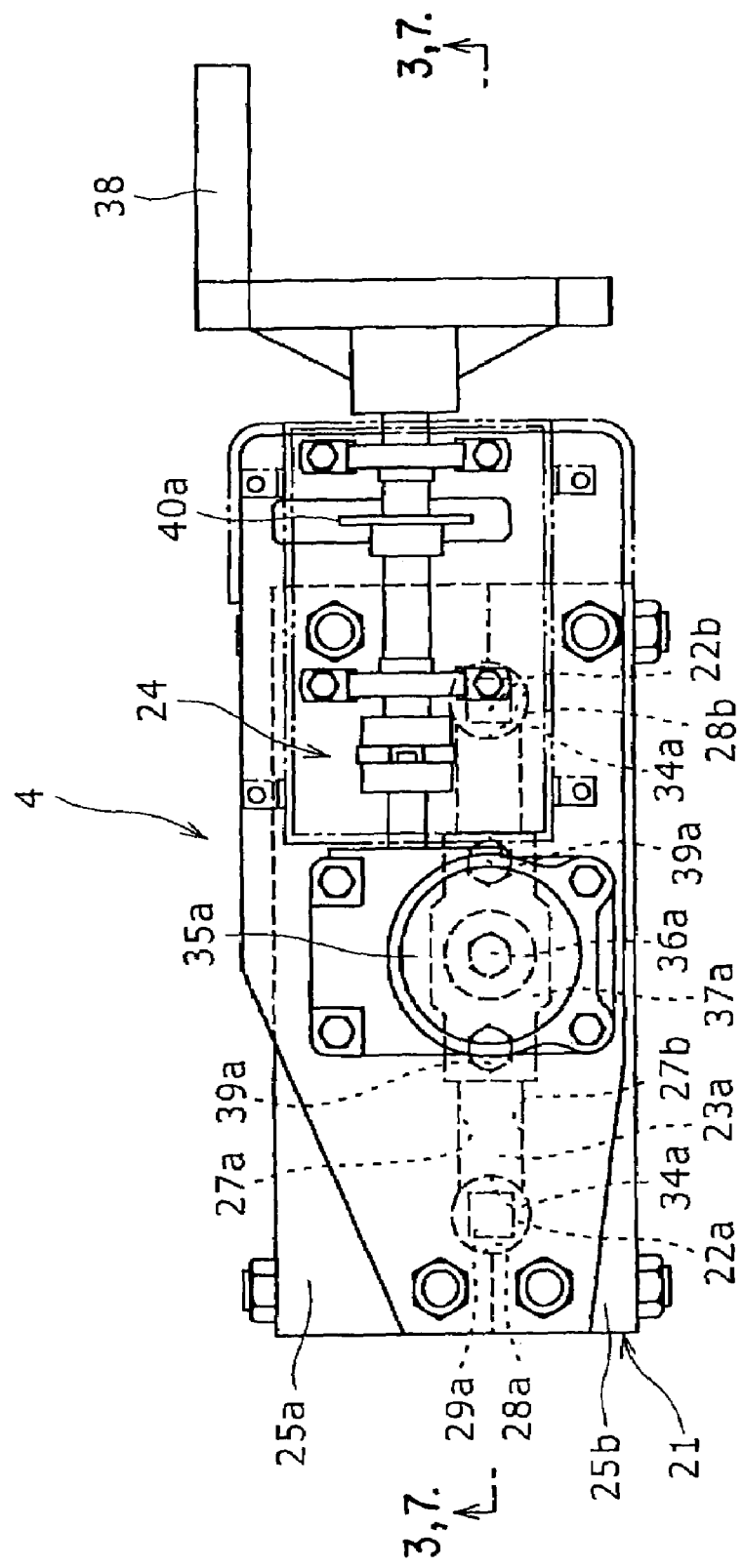
FIG. 2 is a plan view of the mixing degree adjusting device according to the present invention.
Figure 3:
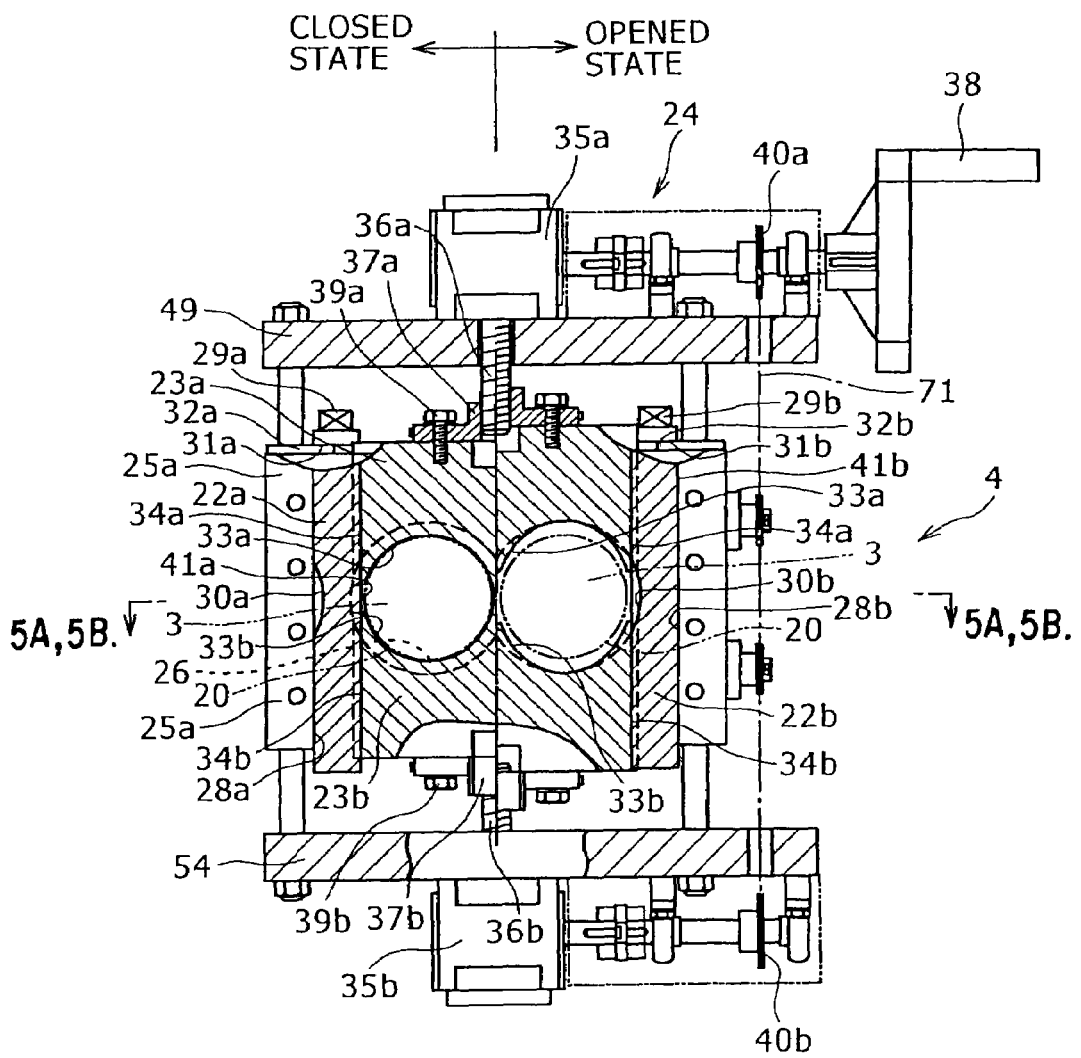
FIG. 3 is a sectional view taken along line 3-3 in FIG. 2.
Figure 4:
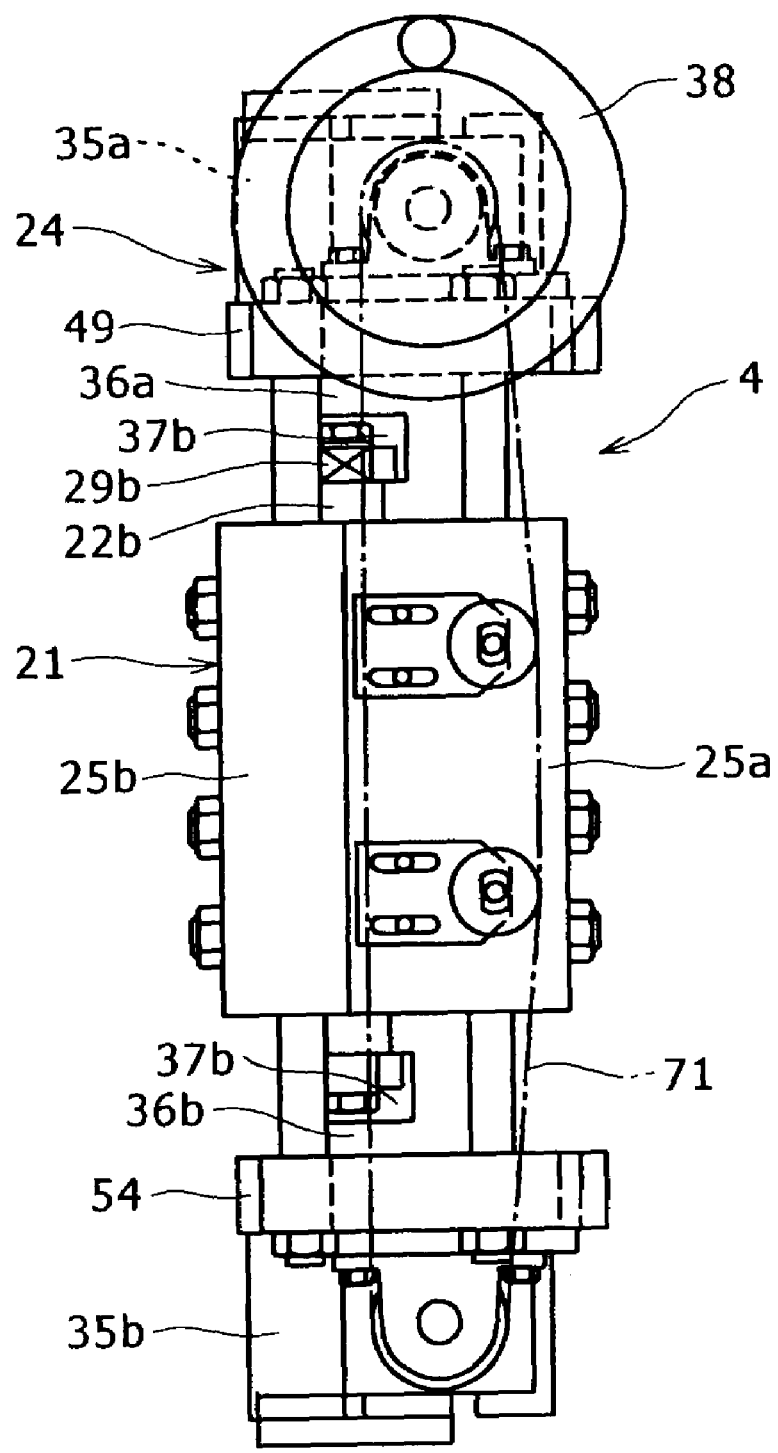
FIG. 4 is a side view of the mixing degree adjusting device.
Figure 5A:
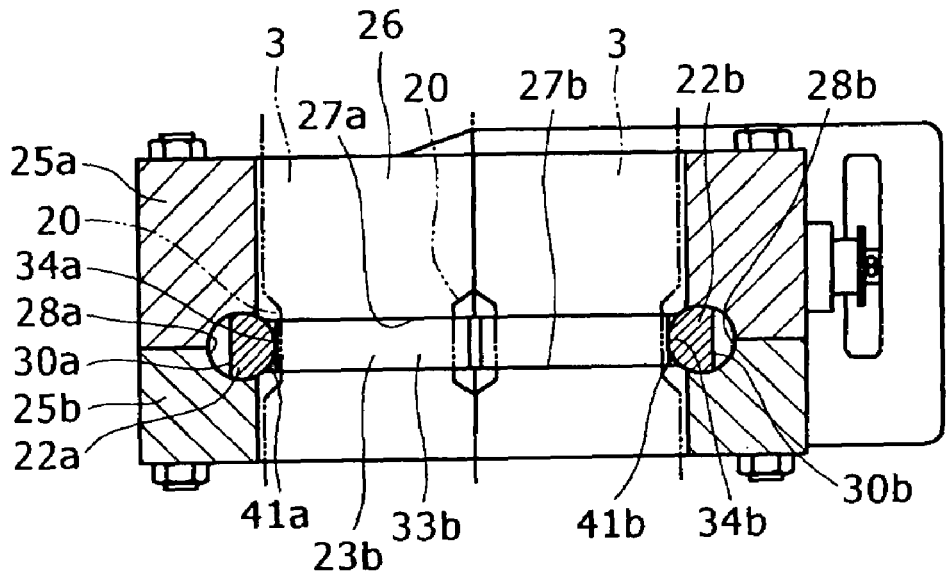
FIG. 5A is a sectional view taken along line 5A-5A in FIG. 3 at the time of adjusting mixing degree.
Figure 5B:
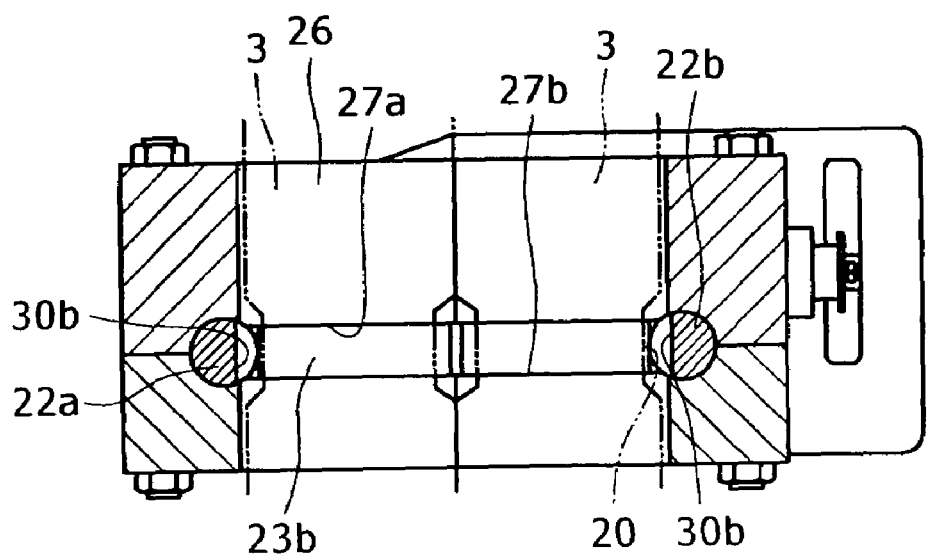
FIG. 5B is a sectional view taken along line 5B-5B in FIG. 3 at the time of extracting screw.
Figure 6:
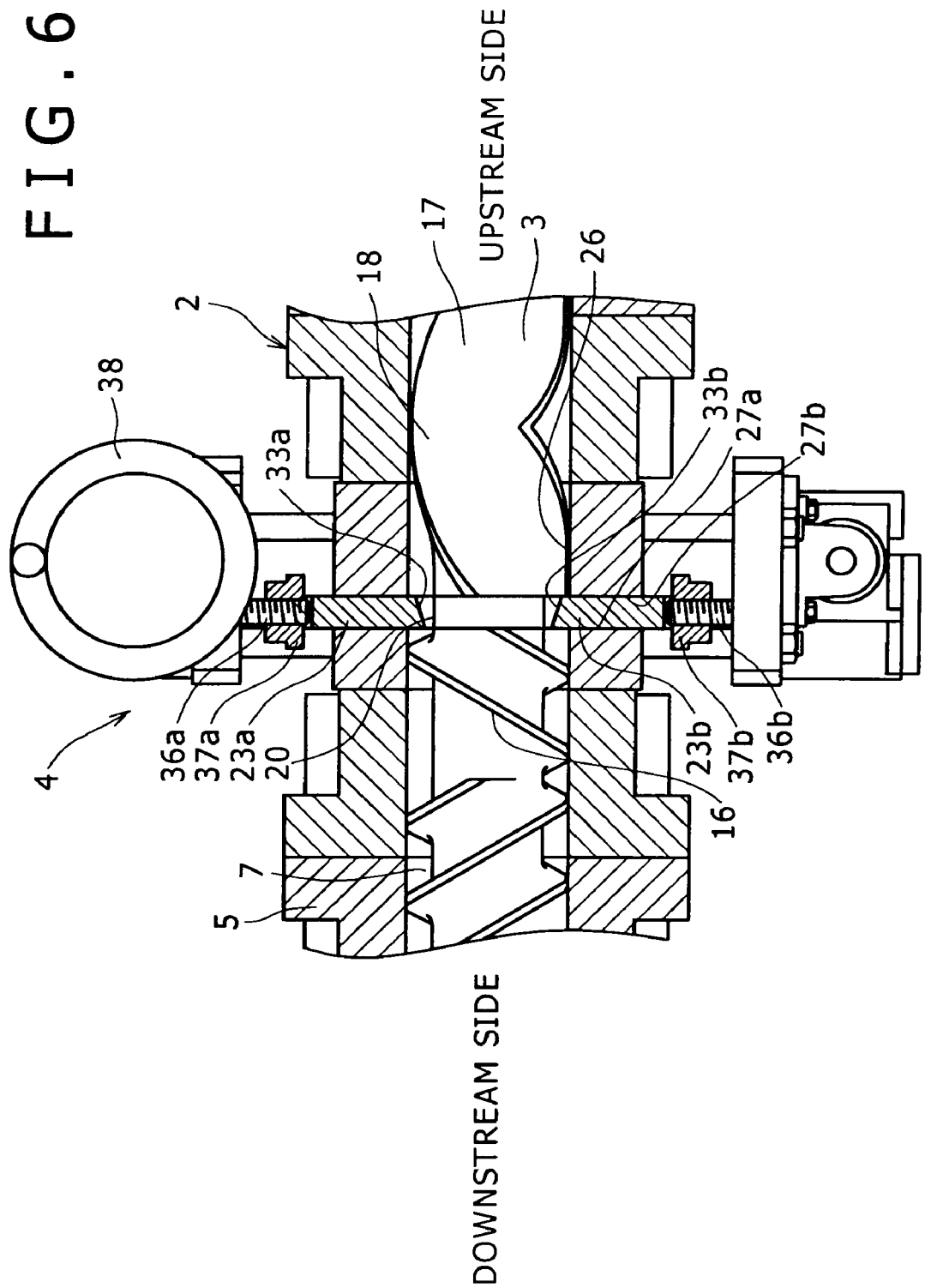
FIG. 6 is a side sectional view of the mixing degree adjusting device.
Figure 7:
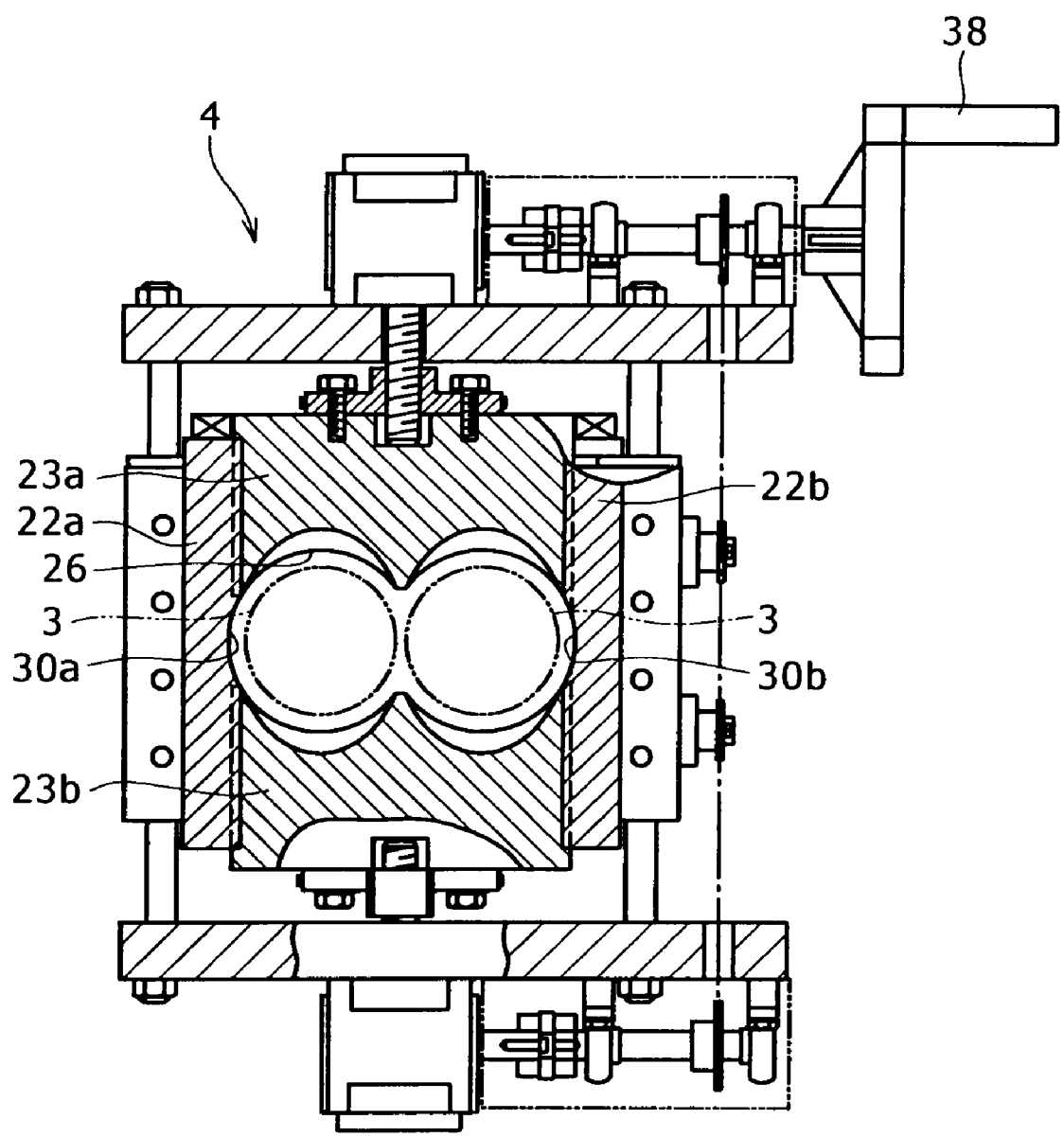
FIG. 7 is a sectional view taken along line 7-7 in FIG. 2 at a screw extracting position.

FIG. 1 is a side sectional view of an intermeshing type twin screw extruder provided with a mixing degree adjusting device according to the present invention, FIG. 2 is a plan view of the mixing degree adjusting device according to the present invention, FIG. 3 is a sectional view taken along line 3-3 in FIG. 2, FIG. 4 is a side view of the mixing degree adjusting device, FIG. 5A is a sectional view taken along line 5A-5A in FIG. 3 at a mixing degree adjusting position, FIG. 5B is a sectional view taken along line 5B-5B in FIG. 3 at a screw extracting position, FIG. 6 is a side sectional view of the mixing degree adjusting device in the intermeshing type twin screw extruder, FIG. 7 is a sectional view taken along line 7-7 in FIG. 2 at the screw extracting position, and FIGS. 8A-8F are views for explaining an effect of the mixing degree adjusting device.

It should be noted that the up and down direction and the lateral direction in the following description means the up and down direction and the lateral direction in FIG. 3. The "mixing degree adjusting position (corresponding to an adjusting position of the present invention)" means a position or a state (such as the direction) of a member (such as a spacer bar described below) provided so as to reduce a clearance on the left and right outer sides of round sectional portions when the extruder performs mixing and extruding. The "screw extracting position (corresponding to a retracting position of the present invention)" means a position or a state (such as the direction) where the member such as the spacer bar is arranged at the time of a screw extracting work.

In FIG. 1, an intermeshing type twin screw extruder 1 (hereinafter, sometimes referred to as the "extruder") includes a cylinder 2, a pair of screws 3 aligned on the left and right sides within the cylinder 2 in a state that the axis thereof is in the front and rear direction, and a mixing degree adjusting device 4.

The cylinder 2 is formed by a plurality of barrel segments 5 (hereinafter, sometimes referred to as the "barrels"). The barrels 5 have through holes 6 having a cross section in an eye-glasses shape, and are coupled with each other so that the holes 6 are communicated in the barrel axial direction. The communicated holes 6 form a chamber (mixing chamber) 7. In the barrel 5 arranged on the most upstream side in the cylinder 2, a material supply port PT1 for supplying an object to be mixed and extruded (a material to be mixed) to the chamber 7 is provided. With the barrel 5 arranged on the most downstream side, a discharge member 8 is coupled. The discharge member 8 is a dye for extrusion molding or the like. In some of the barrels 5 arranged in the middle, connection ports PT2 and PT3 are provided for using as a supply port for supplying a filler or the like to the material to be mixed, or a devolatilization port for devolatilizing the material to be mixed (removing the air included between the materials or a generated volatile component).

The pair of screws 3 is provided in the holes 6 so as to be rotated in the same direction. The screws 3 include a first feeding portion 10, a first mixing portion (corresponding to a mixing wing portion of the present invention) 11, a second feeding portion 12, a second mixing portion 13, a third feeding portion 14 and an extruding portion 15 from the upstream side to the downstream side.

The first feeding portion 10, the second feeding portion 12 and the third feeding portion 14 are provided with a spiral feeding wing for extruding the material to be mixed to the downstream side by rotation. At ends on the most upstream side of the second feeding portion 12 and the third feeding portion 14, spiral returning wings 16 for extruding back the material to be mixed to the upstream side by rotation are provided for approximately one round.

The first mixing portion 11 and the second mixing portion 13 are provided with rotors 19 including feeding wing portions 17 twisted in the direction of extruding the material to be mixed to the downstream side by rotation, and returning wing portions 18 twisted in the direction of extruding back the material to be mixed to the upstream side. At an end on the most downstream side of the first mixing portion 11, round sectional portions 20 having a diameter that is smaller than outer diameters of the feeding portions 10, 12 and 14 and the mixing portions 11 and 13 are provided. The first mixing portion 11 and the second mixing portion 13 prolong staying of the material to be mixed and increase a filling degree within the mixing chamber so as to perform an action of facilitating the mixing of the material to be mixed and also facilitating the devolatilization or the like.

It should be noted that the returning wings 16 provided in the second feeding portion 12 and the third feeding portion 14 are provided so as to assist the above action of the first mixing portion 11 and the second mixing portion 13.

The extruding portion 15 is provided with a spiral feeding wing for extruding the material to be mixed to the downstream side. The feeding wing has a spiral pitch gradually narrowing towards the downstream side and performs an action of enhancing a pressure of the melted material to be mixed and feeding the material to be mixed to the discharge member 8.

Even in the case where the mixing degree adjusting device 4 described later is closed and gate plates (drawing members) 23a and 23b approach to the closest position to both the round sectional portions 20 in the up and down direction, both the round sectional portions 20 approach so close that the gate plates 23a and 23b are not brought in contact with each other.

In FIGS. 2 to 6, the mixing degree adjusting device 4 includes a casing 21, a pair of spacer bars (spacer members) 22a and 22b, a pair of gate plates 23a and 23b, a gate plate drive device 24.

The casing 21 is formed by connecting two case members 25a and 25b so as to have an outer shape of a substantially rectangular parallelepiped and has a through hole 26 having a cross section in an eye-glasses shape and passing through both the two case members 25a and 25b. The through hole 26 constitutes a part of the chamber 7 in the extruder 1, and the two screws 3 are inserted into the through hole 26. On a connection surface of the case members 25a and 25b, concave grooves 27a and 27b to which the gate plates 23a and 23b are fitted are provided. Left and right side surfaces of the concave grooves 27a and 27b form supporting holes 28a and 28b which are vertical holes in a partially cylindrical shape. It should be noted that the supporting holes 28a and 28b are formed at a position where the through hole 26 and a part thereof are overlapped with each other in a plan view (refer to FIG. 5) and thus communicated with the through hole 26.

The spacer bars 22a and 22b are bar shape members having a round cross section and an outer diameter that is substantially equal to an inner diameter of the supporting holes 28a and 28b. At one end thereof, engaging portions 29a and 29b engageable with a spanner or the like are provided and rotatably inserted into the supporting holes 28a and 28b respectively. In the middle of the spacer bars 22a and 22b, concave portions 30a and 30b opening in the lateral direction are provided. The concave portions 30a and 30b are formed by a peripheral surface in a concave shape with a curvature that is equal to a curvature of a peripheral surface of the through hole 26. It should be noted that in the vicinity of an upper end of the spacer bars 22a and 22b, shallow peripheral grooves 31a and 31b are provided, and to a part corresponding to the peripheral grooves 31a and 31b in the casing 21, engaging members 32a and 32b with a part thereof fitted into the peripheral grooves 31a and 31b are attached so that the spacer bars 22a and 22b are not displaced in the up and down direction when the spacer bars 22a and 22b are rotated. It should be noted that it is also possible to form the spacer bars 22a and 22b by tubular (hollow) members with a round cross section of an outer periphery.

The gate plates 23a and 23b are provided with arc concave portions 33a and 33b continuously having two cutouts in a substantially half-round shape with a curvature that is substantially equal to a curvature of a periphery of the round sectional portions 20 of the screws 3. The arc concave portions 33a and 33b have, as shown well in FIG. 6, an inclined surface approaching to the round sectional portions 20 from the upstream side to the downstream side so as to move flow of the material to be mixed from the upstream inward, and hence a dead space generated on the upstream side of the gate plates 23a and 23b is reduced. To end surfaces of the gate plates 23a and 23b in the lateral direction in FIG. 3, guiding grooves 34a to 34b having a cross section in a half-round shape with a curvature that is substantially equal to a curvature of peripheral surfaces 41a and 41b of the spacer bars 22a and 22b are provided in the longitudinal direction of the end surfaces. The guiding grooves 34a to 34b of the gate plates 23a and 23b are sandwiched by the spacer bars 22a and 22b and housed between the concave grooves 27a and 27b of the casing 21 in a state of sandwiching the round sectional portions 20 so that the arc concave portions 33a and 33b are opposed to each other.

The gate plate drive device 24 includes two reducers 35a and 35b, two ball screws 36a and 36b, and two sliders 37a and 37b. The reducers 35a and 35b are respectively fixed to an upper fixing plate 49 and a lower fixing plate 54 integrated with the casing 21 on the upper side and the lower side. The reducers 35a and 35b are a type of converting the direction of a rotational axis by 90 degrees with a worm and a worm gear are built in. The reducers 35a and 35b reduce rotation of a handle wheel 38 and transmit the ball screws 36a and 36b. The sliders 37a and 37b are fixed to opposite end surfaces of the arc concave portions 33a and 33b of the gate plates 23a and 23b by bolts 39a and 39b respectively. By rotation of the ball screws 36a and 36b, the gate plates 23a and 23b are moved upward and downward so as to be retracted from the round sectional portions 20 at the same time or to approach to the round sectional portions 20 at the same time.

The gate plate drive device 24 is provided with sprockets 40a and 40b on the primary side of the reducers 35a and 35b. Both the sprockets 40a and 40b are coupled by a chain 71, and by the rotation of the handle wheel 38, the ball screws 36a and 36b are rotated at the same time. It should be noted that a reduction ratio of the reducers 35a and 35b, a pitch of the ball screws 36a and 36b, and the number of teeth of the sprockets 40a and 40b are all the same, and a degree of upward and downward moving of the gate plates 23a and 23b (a degree of opening and closing) are the same. The gate plate drive device 24 is formed so that the arc concave portions 33a and 33b of the gate plates 23a and 23b form a tiny clearance between the arc concave portions 33a and 33b and the round sectional portions 20 in a totally closed state of the gate plates 23a and 23b.

Next, a description will be given to an operation of adjusting the mixing degree in the mixing degree adjusting device 4, and extracting the screws from the mixing degree adjusting device 4.

In the mixing degree adjusting device 4, when the extruder 1 performs mixing and extracting, the spacer bars 22a and 22b are sustained at the mixing degree adjusting position. Referring to FIGS. 3, 5A and 5B, at the mixing degree adjusting position (at the time of adjusting the mixing degree), the peripheral surfaces 41a and 41b of the spacer bars 22a and 22b protrude from the sides of the round sectional portions 20 into the through hole 26 and oppose to the round sectional portions 20. That is, the peripheral surfaces 41a and 41b are opposing portions opposing to the round sectional portions 20. On a front view, most of a part located on the sides of the round sectional portions 20 among a clearance formed between the through hole 26 and the round sectional portions 20 is closed by the spacer bars 22a and 22b. The adjustment of the mixing degree is performed by rotating the handle wheel 38 and moving the gate plates 23a and 23b so as to change the clearance between the arc concave portions 33a and 33b and the round sectional portions 20. At that time, since the peripheral surfaces 41a and 41b protruding into the through hole 26 of the spacer bars 22a and 22b are formed by a curved surface, there is no rectangular step created in front and rear of a flow route, and the arc concave portions 33a and 33b are the inclined surfaces (FIG. 6). Therefore, it is possible to move the flow in the axial direction of the material to be mixed inward in the vicinity of the gate plates 23a and 23b, and hence it is possible to prevent the generation of the dead space in the mixing degree adjusting device 4.

Referring to FIG. 6, for example, in the case where the mixing degree of the material to be mixed which is extruded from the extruder 1 is not sufficient, the gate plates 23a and 23b are moved in the direction approaching to the screws 3 so as to narrow the clearance between the arc concave portions 33a and 33b and the round sectional portions 20. Then, an amount of the material to be mixed passing through the mixing degree adjusting device 4 is decreased and a staying time of the material to be mixed in the first mixing portion 11 (mixing time) is increased so as to facilitate the mixing.

Meanwhile, in the case where the mixing is sufficiently performed but the extruded amount of the material to be mixed from the extruder 1 is not sufficient, the gate plates 23a and 23b are moved in the direction retracting from the round sectional portions 20 so as to widen the clearance between the arc concave portions 33a and 33b and the round sectional portions 20. Then, the amount of the material to be mixed passing through the mixing degree adjusting device 4 is increased and the extruded amount of the extruder 1 is increased.

Figure 8A:
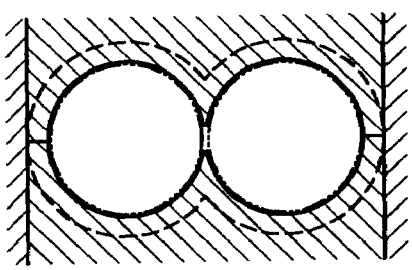
FIG. 8A is a view for explaining an effect of the mixing degree adjusting device while in a closed state.
Figure 8B:
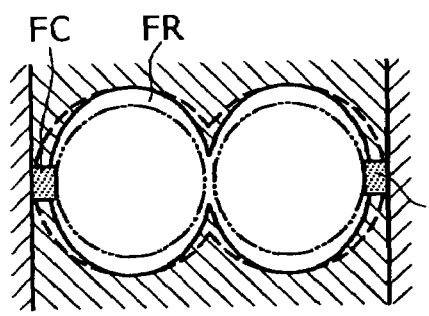
FIG. 8B is a view for explaining an effect of the mixing degree adjusting device while in an opened state.
Figure 8C:
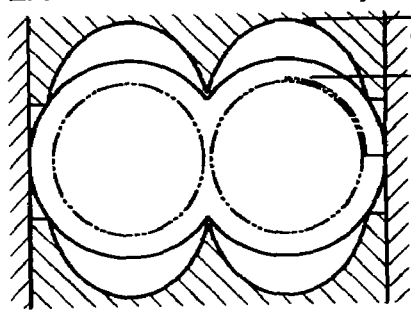
FIG. 8C is a view for explaining an effect of the mixing degree adjusting device at a time of extracting screw.
Figure 8D:
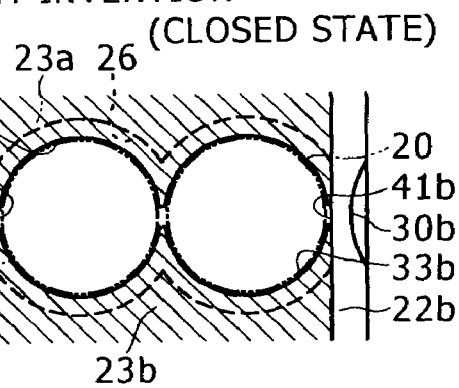
FIG. 8D is a view for explaining an effect of the mixing degree adjusting device at a closed state.
Figure 8E:
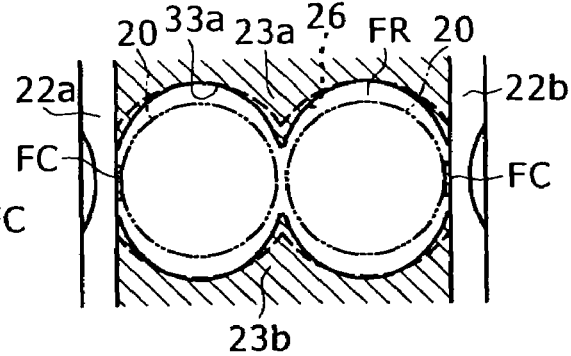
FIG. 8E is a view for explaining an effect of the mixing degree adjusting device at an opened state.
Figure 8F:
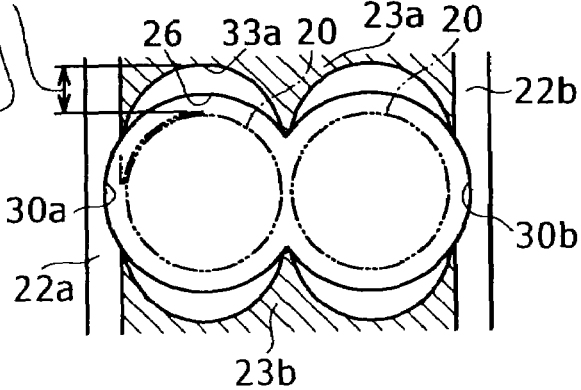
FIG. 8F is a view for explaining an effect of the mixing degree adjusting device at a time of extracting screw.

Referring to FIGS. 8D and 8E, at the mixing degree adjusting position, since the peripheral surfaces 41a and 41b of the spacer bars 22a and 22b protrude into the through hole 26, a clearance FC on the both left and right sides of the round sectional portions 20 is narrowed irrespective of the position of the gate plates 23a and 23b and hence the flow route of the material to be mixed in the clearance FC is limited (shaded part of 8E). Therefore, a change in an opening degree of the gate plates 23a and 23b is reflected to an increase and a decrease of a flow route FR between the arc concave portions 33a and 33b and the round sectional portions 20, and a cross section of flow route is not radically changed. Consequently, it is possible to easily perform fine-adjustment of the mixing degree of the material to be mixed.

In the mixing degree adjusting device 4, the peripheral surfaces 41a and 41b of the spacer bars 22a and 22b are slidably fitted into the guiding grooves 34a and 34b of the gate plates 23a and 23b, and the gate plates 23a and 23b are guided by the spacer bars 22a and 22b and moved in the up and down direction. Therefore, even when received a force in the axial direction from the flowing material to be mixed, the gate plates 23a and 23b are stably moved upward and downward.

In the mixing degree adjusting device 4, when the screws are extracted from the extruder 1, the spacer bars 22a and 22b are switched from the mixing degree adjusting position to the screw extracting position. The switching from the mixing degree adjusting position to the screw extracting position is performed by engaging the engaging portions 29a and 29b with the spanner and rotating the spacer bars 22a and 22b so that the concave portions 30a and 30b are opened towards the round sectional portions 20 as shown in FIGS. 5B and 7. Thereby, the spacer bars 22a and 22b are retracted to the left and right outer sides of the through hole 26 on a front view.

Following the switching of the spacer bars 22a and 22b to the screw extracting position, when the handle wheel 38 is rotated so as to move the gate plates 23a and 23b to a position that is the most distant from the screws 3, the gate plates 23a and 23b are retracted to the up and down outer sides of the through hole 26 on a front view, and hence it is possible to extract the screws 3. At that time, as shown well in FIG. 7, the concave portions 30a and 30b are continued to the peripheral surface of the through hole 26 and become a part of sectional outline in the eye-glasses shape of the through hole 26, and the gate plates 23a and 23b are housed in the concave grooves 27a and 27b until there is no part thereof protruding into the through hole 26. By such a configuration, in the mixing degree adjusting device 4, it is possible to remove projections that are to be disturbing at the time of passing the feeding wings, the returning wings, the feeding wing portions 17, and the returning wing portions 18 from the inside of the through hole 26, and hence it is possible to easily perform the extracting of the screws 3.

The mixing degree adjusting device 4 is formed so as to close the clearance FC between the though hole 26 and the round sectional portions 20 on the left and right outer sides of the round sectional portions 20 by the spacer bars 22a and 22b. Therefore, there is no need for extending end edges on the sides of the gate plates 23a and 23b until brought into contact with each other unlike a comparative example in FIG. 8A. Consequently, as compared in FIGS. 8C and 8F, it is possible to shorten an action length of the gate plates 23a and 23b at the time of extracting the screws 3 in comparison to the comparative example, and hence it is possible to decrease limitation on an installment place for the extruder 1.

Figure 9:
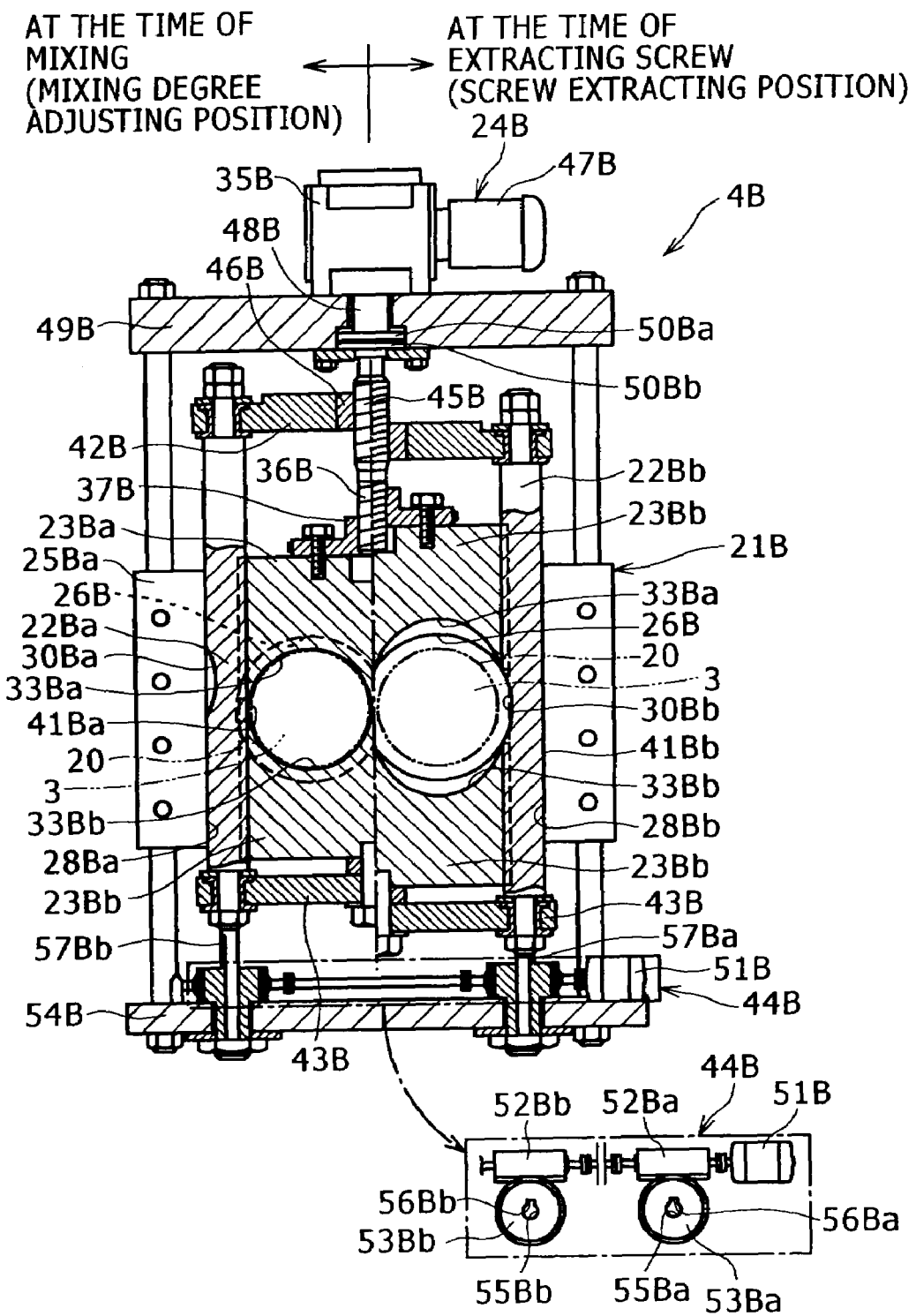
FIG. 9 is a front view of a mixing degree adjusting device according to a second embodiment.

FIG. 9 is a front view of a mixing degree adjusting device 4B according to a second embodiment of the present invention. With regard to the mixing degree adjusting device 4B, a description will be only given to different points from the mixing degree adjusting device 4 mentioned above.

In FIG. 9, the mixing degree adjusting device 4B has an upper movable plate 42B, a lower movable plate 43B, spacer bars 22Ba and 22Bb, a gate plate drive device 24B, and a bar rotating device 44B.

In the upper movable plate 42B, a second slider 46B screwed to a second ball screw 45B described later is provided at substantial center. On the left and right sides of the upper movable plate 42B, upper ends of the spacer bars 22Ba and 22Bb are rotatably supported.

To substantial center of the upper movable plate 43B, a gate plate 23Bb is fixed and connected. Both left and right end parts of the lower movable plate 43B rotatably support the spacer bars 22Ba and 22Bb in the vicinity of lower ends thereof.

The upper movable plate 42B, the lower movable plate 43B, the spacer bars 22Ba and 22Bb and the gate plate 23Bb are coupled in such a way and integrally moved in the up and down direction in FIG. 9.

Lower ends of the spacer bars 22Ba and 22Bb further protrude from the lower movable plate 43B to the lower side. The protruding part is driven by the bar rotating device 44B described later so that the spacer bars 22Ba and 22Bb are rotated.

It should be noted that the spacer bars 22Ba and 22Bb are formed by bar shape members having a round cross section and an outer diameter that is substantially equal to an inner diameter of supporting holes 28Ba and 28Bb of a case member 25Ba, and in the middle, concave portions 30Ba and 30Bb formed by a peripheral surface with a curvature that is equal to a curvature of a peripheral surface of a through hole 26B are provided. The above point is the same as the spacer bars 22a and 22b in the mixing degree adjusting device 4.

The gate plate derive device 24B includes a motor 47B serving as a drive source, a reducer 35B, a drive axis 48B, a slider 37B, and a second slider 46B. The reducer 35B has the same configuration as the reducers 35a and 35b in the mixing degree adjusting device 4.

The drive axis 48B is provided with a ball screw 36B and a second ball screw 45B from the front end side to the reducer 35B side in order. The ball screw 36B is screwed with the slider 37B fixed to a gate plate 23Ba arranged on the upper side, and the second ball screw 45B is screwed with the second slander 46B of the upper movable plate 42B. The second ball screw 45B is a screw with a left hand thread having the same pitch as the ball screw 36B. For one rotation of the drive axis 48B, the slider 37B and the second slider 46B are moved the same distance in the opposite directions to each other, and the gate plates 23Ba and 23Bb are moved to the same extent in the opening direction or the closing direction at the same time. Since thrust bearings 50Ba and 50Bb are used for a bearing in an upper fixing plate 49B of the drive axis 48B, rotation accuracy is improved.

The bar rotating device 44B includes a motor 51B, worms 52Ba and 52Bb, and worm gears 53Ba and 53Bb. The motor 51B, the worms 52Ba and 52Bb, the worm gears 53Ba and 53Bb and the like are attached to a lower fixing plate 54B integrated with a casing 21B. A stepping motor in which the rotation speed is controllable is used as the motor 51B. A servomotor may be used. The worms 52Ba and 52Bb are directly connected to the motor 51B and meshed with the worm gears 53Ba and 53Bb respectively.

At rotational center of the worm gears 53Ba and 53Bb, holes 55Ba and 55Bb are provided. In a state that lower ends of the spacer bars 22Ba and 22Bb protruding from the lower movable plate 43B are retractably inserted into the holes 55Ba and 55Bb, the worm gears 53Ba and 53Bb are rotatably attached to the lower fixing plate 54B. Key grooves 56Ba and 56Bb are provided in the holes 55Ba and 55Bb. Since the key grooves 56Ba and 56Bb are engaged with keys 57Ba and 57Bb provided in the lower ends of the spacer bars 22Ba and 22Bb, the worm gears 53Ba and 53Bb transmit the rotation to the spacer bars 22Ba and 22Bb. The key grooves 56Ba and 56Bb and the keys 57Ba and 57Bb are formed so that the concave portions 30Ba and 30Bb of the two spacer bars 22Ba and 22Bb are opposed to the through hole 26B at the same timing.

Next, a description will be given to switching between the mixing degree adjusting position and the screw extracting position in the mixing degree adjusting device 4B.

Referring to FIG. 9, when the extruder 1 performs mixing and extracting, in the mixing degree adjusting device 4B, the spacer bars 22Ba and 22Bb are sustained at the mixing degree adjusting position, that is in a state that peripheral surfaces 41Ba and 41Bb protrude into the through hole 26B and most of the clearance FC on the left and right outer sides of the round sectional portions 20 is closed. The adjustment of the mixing degree is performed by rotating the drive axis 48B and moving the gate plates 23Ba and 23Bb upward and downward so as to change the clearance between arc concave portions 33Ba and 33Bb and the round sectional portions 20 of the screws 3. At that time, the ball screw 36B and the second ball screw 45B are screws having the same pitch but with a right hand thread and a left hand thread respectively. Therefore, the upper gate plate 23Ba and the lower gate plate 23Bb are moved the same distance in the opposite directions from each other. The mixing degree adjusting device 4B is different from the mixing degree adjusting device 4 in a point that the spacer bars 22Ba and 22Bb are integrated with the gate plate 23Bb by the lower movable plate 43B, and the gate plate 23Bb is moved upward and downward by moving the spacer bars 22Ba and 22Bb upward and downward.

The switching of the spacer bars 22Ba and 22Bb in the mixing degree adjusting device 4B from the mixing degree adjusting position to the screw extracting position is performed as follows. That is, firstly, the motor 47B is rotated so as to move the gate plates 22Ba and 22Bb to a position that is the most distant from the round sectional portions 20. Then, the spacer bars 22Ba and 22Bb are moved downward with the gate plate 23Bb, and the concave portions 30Ba and 30Bb are stopped at a position opposite to the through hole 26B right on the side of the round sectional portions 20. Successively, when the motor 51B is rotated for predetermined times, the spacer bars 22Ba and 22Bb are rotated by a predetermined angle by the worm gears 53Ba and 53Bb and the concave portions 30Ba and 30Bb face the through hole 26B so that the switching to the screw extracting position is finished. It should be noted that in order not to rotate the spacer bars 22Ba and 22Bb exceeding the predetermined angle, a mechanical stopper is more preferably provided for the spacer bars 22Ba and 22Bb.

At the screw extracting position, at the time of extracting the screws 3, it is possible to remove projections that are to be disturbing the feeding wings, the returning wings, the feeding wing portions 17, and the returning wing portions 18 from the periphery of the round sectional portions 20, and hence it is possible to easily extract the screws 3.

Figure 10:
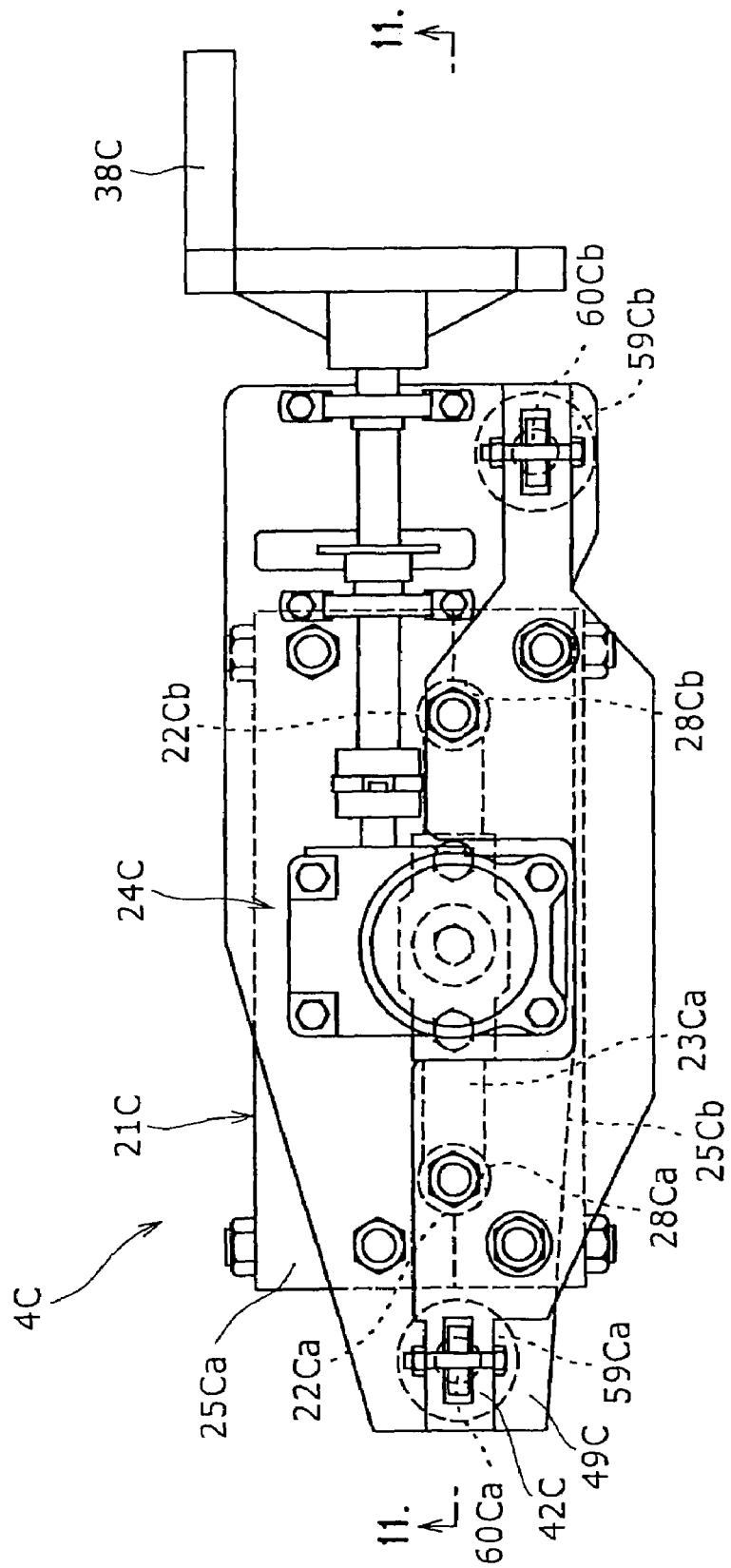
FIG. 10 is a plan view of a mixing degree adjusting device according to a third embodiment.
Figure 11:
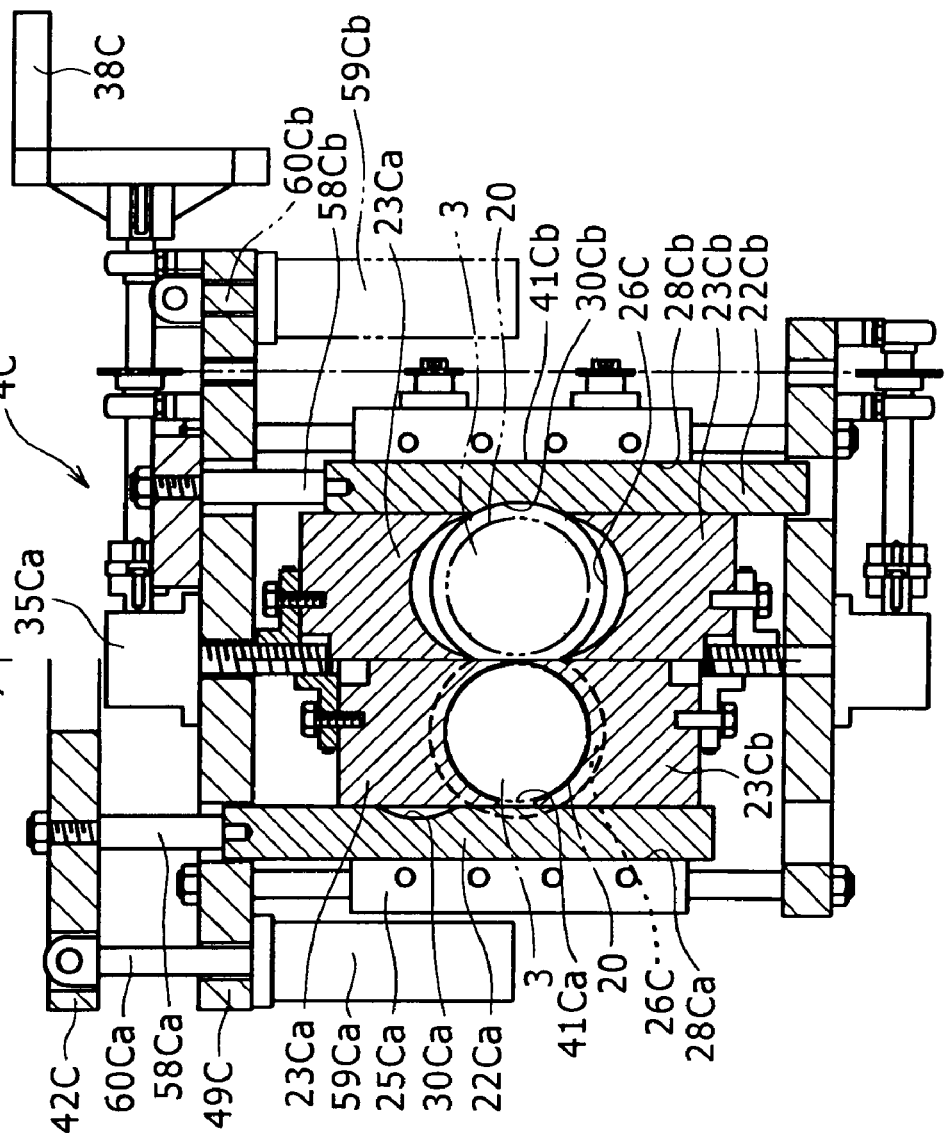
FIG. 11 is a sectional view taken along line 11-11 in FIG. 10.

FIG. 10 is a plan view of a mixing degree adjusting device 4C according to a third embodiment, and FIG. 11 is a sectional view taken along line 11-11 in FIG. 10. It should be noted that the up and down direction in the following description means the up and down direction in FIG. 11. A casing 21C a pair of gate plates 23Ca and 23Cb and a gate plate drive device 24C in the mixing degree adjusting device 4C are substantially the same as in the mixing degree adjusting device 4, and hence an explanation thereof will be omitted.

In FIGS. 10 and 11, two spacer bars 22Ca and 22Cb are formed by bar shape members having a round cross section and an outer diameter that is substantially equal to an inner diameter of supporting holes 28Ca and 28Cb of case members 25Ca and 25Cb. In the substantially middle of the spacer bars 22Ca and 22Cb, concave portions 30Ca and 30Cb are provided, and the concave portions 30Ca and 30Cb are formed by a concave peripheral surface with a curvature that is equal to a curvature of a peripheral surface of a through hole 26C so that there is no part protruding into the through hole 26C at the time of opposing to the round sectional portions 20 from the right-beside. With upper ends of the spacer bars 22Ca and 22Cb, supporting bars 58Ca and 58Cb are coupled, and both the supporting bars 58Ca and 58Cb are fixed to an upper movable plate 42C at upper ends thereof.

To an upper fixing plate 49C to which a reducer 35Ca is attached, two pneumatic cylinders 59Ca and 59Cb are fixed at both left and right end parts. The pneumatic cylinders 59Ca and 59Cb are a double acting type, and front ends of rods 60Ca and 60Cb are slidably connected to the upper movable plate 42C. Therefore, by an extending action of the pneumatic cylinders 59Ca and 59Cb, the spacer bars 22Ca and 22Cb are raised with the upper movable plate 42C, and by a contracting action of the pneumatic cylinders 59Ca and 59Cb, the spacer bars 22Ca and 22Cb are lowered with the upper movable plate 42C.

In the mixing degree adjusting device 4C, when the extruder 1 is operated, the spacer bars 22Ca and 22Cb are sustained at the mixing degree adjusting position. The mixing degree adjusting position is realized when the rods 60Ca and 60Cb of the pneumatic cylinders 59Ca and 59Cb are at extending ends. At the mixing degree adjusting position, peripheral surfaces 41Ca and 41Cb of the spacer bars 22Ca and 22Cb protrude into the through hole 26C so as to narrow the clearance FC between the round sectional portions 20 and the through hole 26C on the left and right outer sides of the round sectional portions 20 and hence limit the flow of the material to be mixed in the clearance FC. Therefore, a change in an opening degree of the gate plates 23Ca and 23Cb is reflected to only a distance between arc concave portions 33Ca and 33Cb and the round sectional portions 20 so as not to radically change the cross section of flow route. Consequently, it is possible to easily perform the fine-adjustment of the mixing degree of the material to be mixed.

At the time of extracting the screws from the extruder 1, the spacer bars 22Ca and 22Cb are switched from the mixing degree adjusting position to the screw extracting position. The switching is performed by making the pneumatic cylinders 59Ca and 59Cb perform the contracting action and lowering the spacer bars 22Ca and 22Cb to a position where the concave portions 30Ca and 30Cb correspond to the through hole 26C on a front view. Successively when a handle wheel 38C is rotated so as to move the gate plates 23Ca and 23Cb to a position that is the most distant from the round sectional portions 20, it is possible to extract the screws 3.

Figure 12:
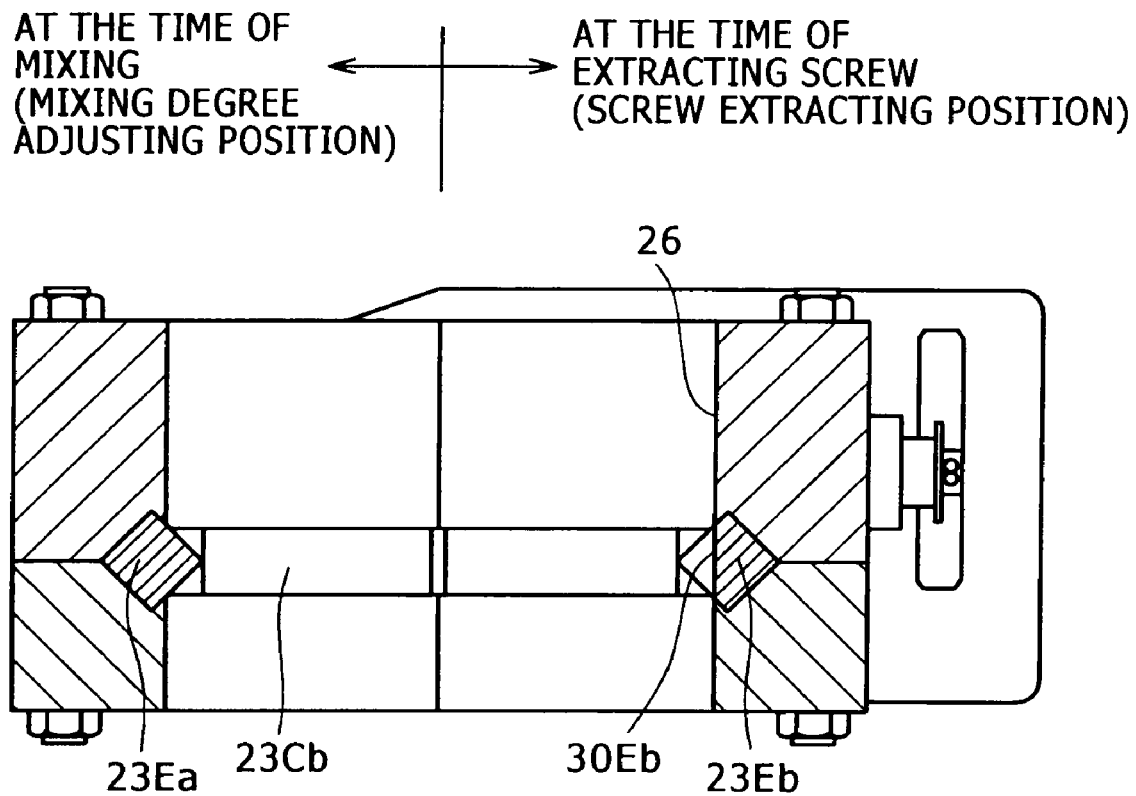
FIG. 12 is a view showing another embodiment of a spacer bar.

Even when spacer bars (space members) having a predetermined concave portion formed by a bar shape member or a plate shape member with a cross section in an elliptical shape, an oval shape or a polygonal shape are used instead of the spacer bars 22Ca and 22Cb in the mixing degree adjusting device 4C, it is possible to obtain the same effect as in the mixing degree adjusting device 4C. For example, spacer bars 22Ea and 22Eb having a square cross section as shown in FIG. 12 may be used. The spacer bars 22Ea and 22Eb are provided with a concave portion 30Eb having a concave peripheral surface with a curvature that is equal to a curvature of the peripheral surface of the through hole 26C so as to correspond to the through hole 26C at the screw extracting position on a front view. It is possible to form the spacer bars with using a hollow bar shape member. It is also possible to use a hydraulic cylinder instead of the pneumatic cylinder, and various motors instead of the handle.

Figure 13:
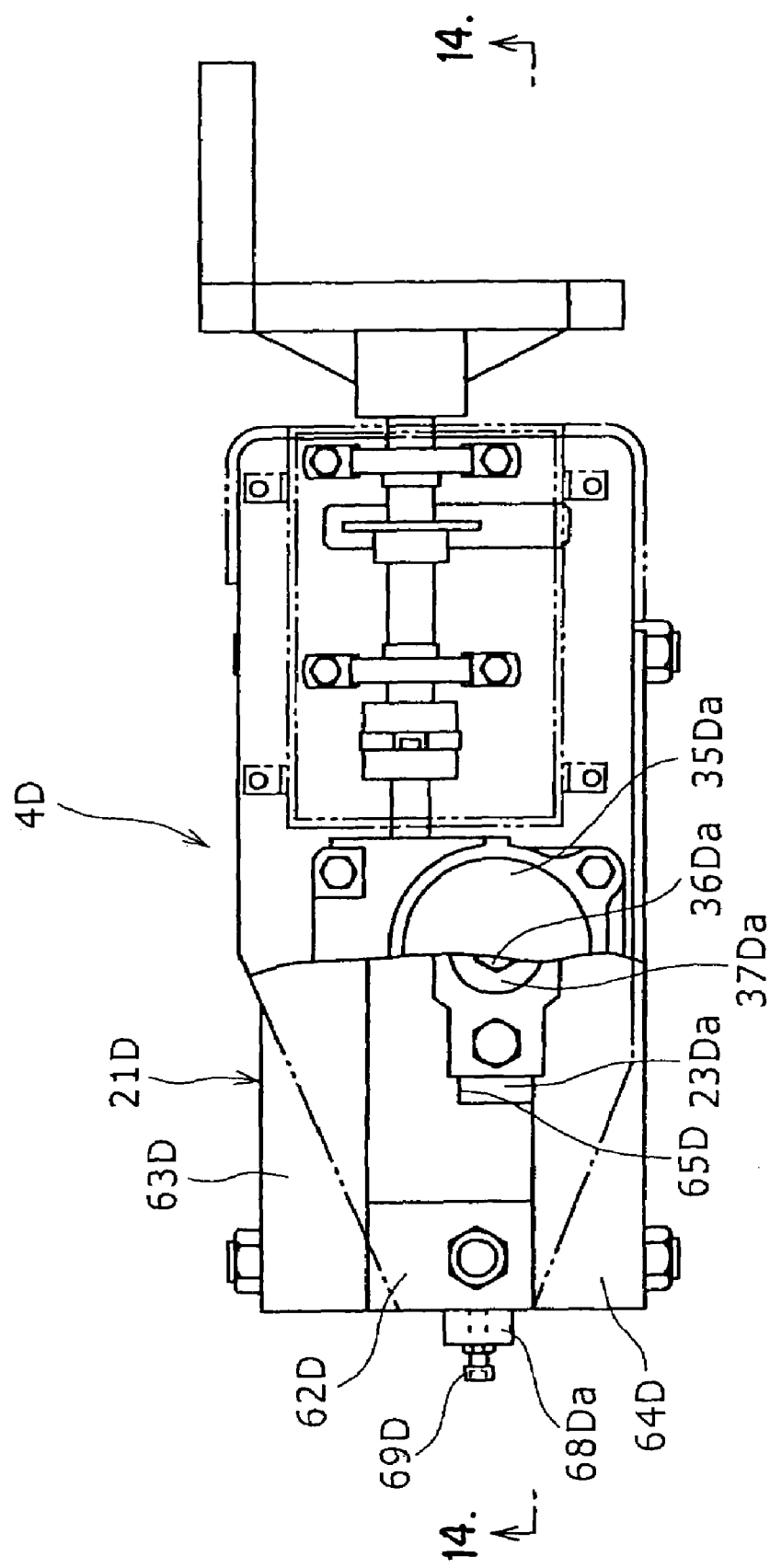
FIG. 13 is a plan view of a mixing degree adjusting device according to a fourth embodiment.
Figure 14:
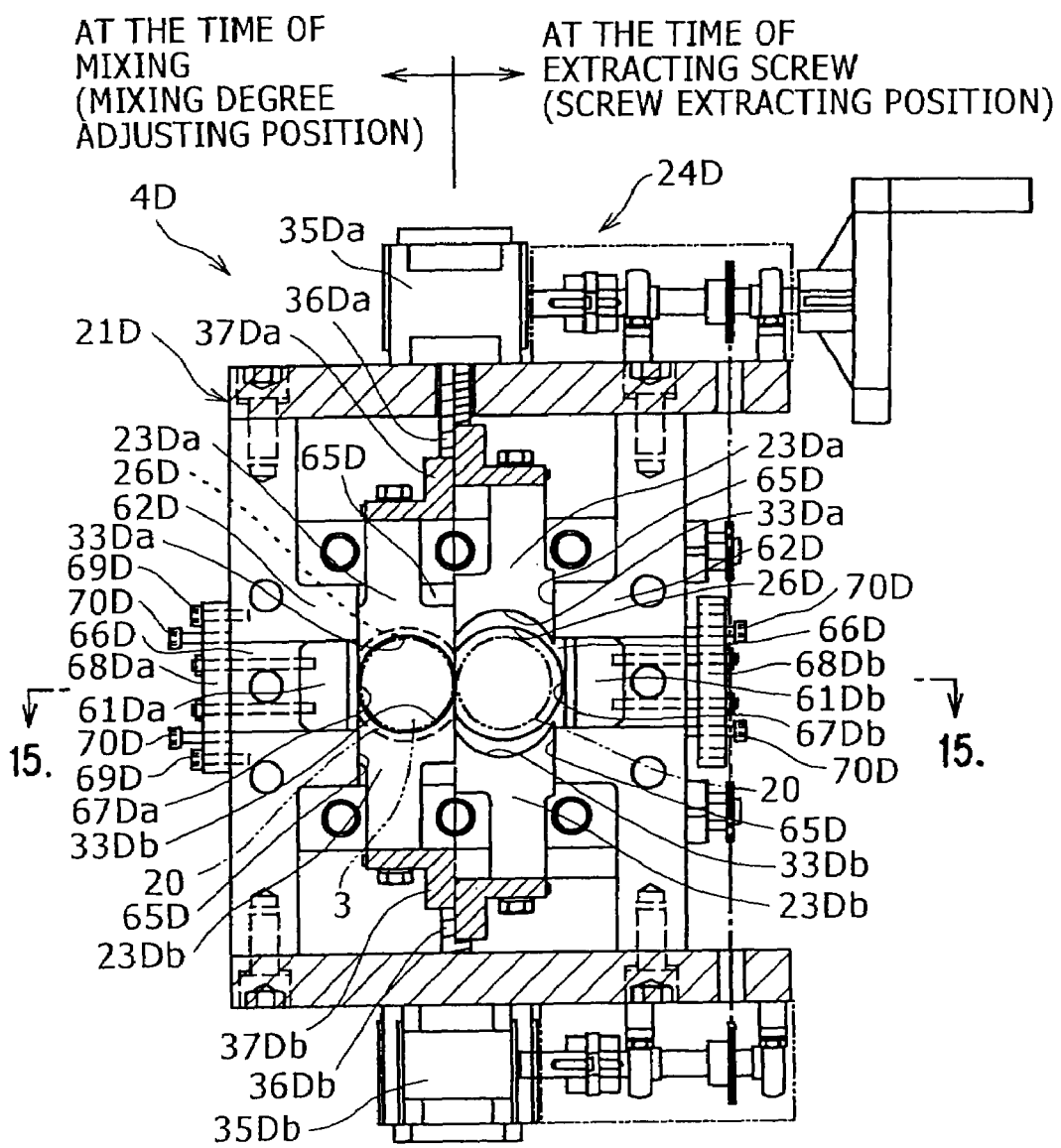
FIG. 14 is a sectional view taken along line 14-14 in FIG. 13.
Figure 15:
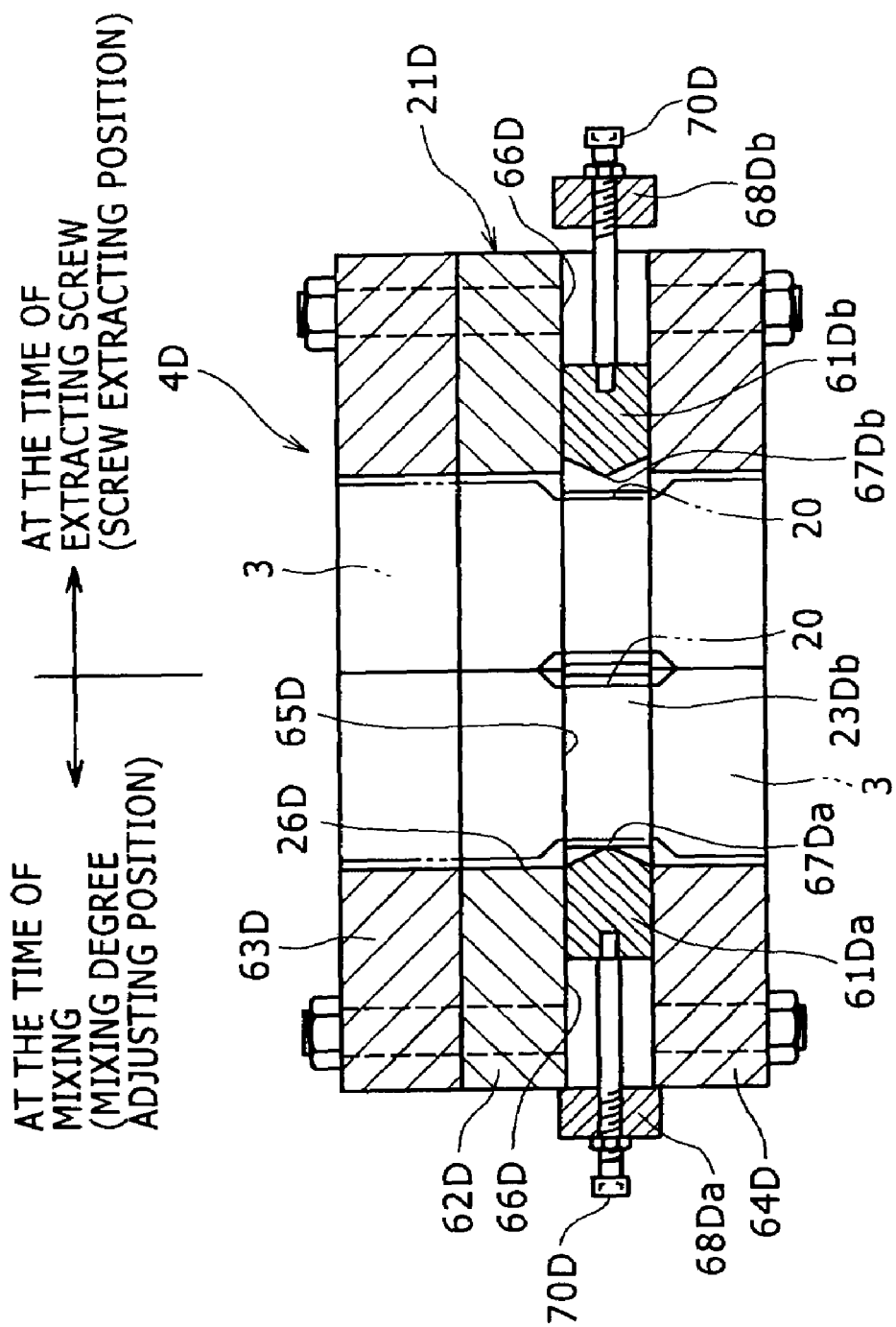
FIG. 15 is a sectional view taken along line 15-15 in FIG. 14.

FIG. 13 is a plan view of a mixing degree adjusting device 4D according to a fourth embodiment, FIG. 14 is a sectional view taken along line 14-14 in FIG. 13, and FIG. 15 is a sectional view taken along line 15-15 in FIG. 14. It should be noted that the up and down direction in the following description means the up and down direction in FIG. 13, and the lateral direction means the lateral direction in FIGS. 13 to 15.

In FIGS. 13 to 15, the mixing degree adjusting device 4D includes a casing 21D, a pair of gate plates 23Da and 23Db, a pair of spacers 61Da and 61Db, and a gate plate drive device 24D.

The casing 21D includes a main body 62D, a first side plate 63D and a second side plate 64D sandwiching the main body 62D from the front and rear direction. In the casing 21D, a through hole 26D having a cross section in an eye-glasses shape and passing through the casing 21D in the direction from the first side plate 63D side to the second side plate 64D side is provided. The through hole 26D forms a part of the chamber 7 in the extruder 1, and the two screws 3 are inserted into the through hole 26D.

In the main body 62D, a concave groove 65D opening to the second side plate 64D side, having width that is narrower than width of the through hole 26D in the lateral direction, and extending in the up and down direction, and a spacer groove 66D opening to the second side plate 64D side, having width that is substantially equal to width of the through hole 26D in the up and down direction, and extending in the lateral direction are provided, and the through hole 26D is overlapped with a part of both the grooves. Depth of the concave groove 65D and depth of the spacer groove 66D are substantially equal to each other.

The gate plates 23Da and 23Db are formed by plate shape members having width and thickness that are substantially equal to width and thickness of the concave groove 65D. The gate plates 23Da and 23Db are aligned on the upper side and the lower side and fitted into the concave groove 65D movably upward and downward respectively. End surfaces of the gate plates 23Da and 23Db opposing to each other have arc concave portions 33Da and 33Db including two cutouts in a substantially half-round shape with a curvature that is substantially equal to a curvature of periphery of the round sectional portions 20. The arc concave portions 33Da and 33Db are inclined surfaces that move the flow of the material to be mixed from the upstream side inward as well as the arc concave portions 33a and 33b in the mixing degree adjusting device 4.

The spacers 61Da and 61Db are formed by plate shape members having width and thickness that are substantially equal to width and thickness of the spacer groove 66D. In FIG. 14, one of the spacers 61Da and 61Db is fitted on the left side of the spacer groove 66D and the other is fitted on the right side. End surfaces 67Da and 67Db of the spacers 61Da and 61Db on the through hole 26D side are, as shown in FIG. 15, inclined surfaces to the through hole 26D side so that the flow in the axial direction is moved inward and the generation of the dead space is prevented.

The gate plate drive device 24D includes reducers 35Da and 35Db, ball screws 36Da and 36Db, and sliders 37Da and 37Db. The reducers 35Da and 35Db, the ball screws 36Da and 36Db, and the sliders 37Da and 37D have the substantially same configuration and function as in the mixing degree adjusting device 4, and hence an explanation thereof will be omitted.

The adjustment of the mixing degree by the mixing degree adjusting device 4D is performed by fixing the spacers 61Da and 61Db at the mixing degree adjusting position, that is, a position where end edges 67Da and 67Db thereof approach to the round sectional portions 20. The position of the spacers 61Da and 61Db is determined by switching boards 68Da and 68Db coupled with the spacers 61Da and 61Db. The switching boards 68Da and 68Db are coupled with the spacers 61Da and 61Db having a clearance so that the position of the spacers 61Da and 61Db is appropriate when brought into contact with the main body 62D. At the time of adjusting the mixing degree, the switching boards 68Da and 68Db are fixed to the main body 62D by fixing bolts 69D so as to prevent a change in the position of the spacers 61Da and 61Db at the time of mixing.

An action of the gate plates 23Da and 23Db at the time of adjusting the mixing degree is the same as the mixing degree adjusting devices 4, 4B and 4C mentioned above.

The switching of the gate plates 23Da and 23Db from the mixing degree adjusting position to the screw extracting position is performed by releasing the fixing of the spacers 61Da and 61Db to the main body 62D by the fixing bolts 69D, and screwing pushing bolts 70D into the switching boards 68Da and 68Db so that the switching boards 68Da and 68Db are retracted from the main body 62D until the end surfaces 67Da and 67Db of the spacers 61Da and 61Db do not protrude into the through hole 26D.

In the mixing degree adjusting device 4D, at the time of mixing, the clearance FC on the left and right outer sides of the round sectional portions 20 is narrowed by the spacers 61Da and 61Db, and the flow route of the material to be mixed is limited in the clearance FC. Therefore, the cross section of flow route is not radically changed due to a change in an opening degree of the gate plates 23Da and 23Db. Consequently, it is possible to easily perform the fine-adjustment of the mixing degree. In the extracting work of the screws 3, since the gate plates 23Da and 23Db are retreated to the left and right sides so as not to protrude into the through hole 26D, it is possible to easily perform the extracting of the screws 3.

The effect of the mixing degree adjusting device 4 with regard to the mixing degree adjusting position and the screw extracting position described with reference to FIGS. 8A to 8F is also exhibited in the mixing degree adjusting devices 4B, 4C and 4D in the other embodiments.

In the first to third embodiments mentioned above, it is possible to rotate or move the spacer bars 22a to 22Cb upward and downward, and move the spacers 61Da and 61Db by using a method other than the methods described above. The concave portions 30a to 30Cb of the spacer bars 22a to 22Cb may be formed so that there is no part protruding into the through holes 26, 26B and 26C at the screw extracting position. It is possible to form the concave portions 30a to 30Cb by concave portions in various shapes except for forming by the concave peripheral surfaces with the curvature that is equal to the curvature of the peripheral surfaces of the through holes 26, 26B and 26C. For example, with concave portions having a cross section seen from the direction orthogonal to the axis in various shapes such as a triangle shape, a rectangle shape, and an elliptical shape, it is possible to exhibit the same effect as the concave portions 30a to 30Cb.

In the embodiments mentioned above, the spacer bars 22a to 22Db and the gate plates 23a to 23Db are retracted to the outside of the through holes 26 to 26D on a front view. However, the spacer bars 22a to 22Db and the gate plates 23a to 23Db may be at least retractable to the outside until the passage of the screws 3 is accepted at the time of extracting the screws 3 from the barrels 5.

It is possible to properly change an individual configuration or the entire structure, a shape, size, the number, a material or the like of the mixing degree adjusting devices 4, 4B, 4C and 4D and constituent components in accordance with the gist of the present invention.

As mentioned above, the mixing degree adjusting device according to the present invention is a mixing degree adjusting device for adjusting a mixing degree of an object to be mixed by regulating a flow rate of the object to be mixed that flows along round sectional portions, the mixing degree adjusting device being provided at a position corresponding to the round sectional portions in an intermeshing type twin screw extruder in which a pair of screws provided with the round sectional portions having a diameter that is smaller than an outer diameter of a mixing wing portion on the downstream side of the mixing wing portion for mixing the object to be mixed are aligned within a barrel, comprising a pair of spacer members arranged at a position sandwiching both the round sectional portions from both sides in the aligning direction of the pair of screws, and a pair of drawing members arranged as a position sandwiching both the round sectional portions from both sides in the orthogonal direction that is orthogonal to the aligning direction, the spacer members being movable between an adjusting position for coming into the inside of the outer diameter of the mixing wing portion in the aligning direction and opposing to the round sectional portions, and a retracting position, when the screws are extracted from the barrel, for retracting to the outside until the passage of the screws is accepted, and opposing portions opposing to the round sectional portions at the time of moving to the adjusting position being formed in a substantially linear shape extending substantially in parallel with the orthogonal direction seen from the axial direction of the screws, and the drawing members being formed in a shape in which end parts thereof on the both round sectional portions side are along peripheral surfaces of the round sectional portions, movable in the direction approaching to and retracting from the round sectional portions along the opposing portions in an area intervening between the opposing portions of both the spacer members at the time of moving to the adjusting position, and when the screws are extracted from the barrel, retractable to the outside until the passage of the screws is accepted.

The "mixing position" means a position for adjusting the mixing degree, that is, a position or an arrangement state (such as the direction) of the spacer members when the extruder performs mixing and extruding. The "retracting position" means a position for extracting the screws, that is, a position or an arrangement state (such as the direction) of the spacer members when the screw extracting work is performed.

According to the present invention, when the screws are extracted from the barrel, both the spacer members and the drawing members are retractable to the outside until the passage of the screws is accepted. Therefore, it is possible to extract the screws without interfering the spacer members and the drawing members. Further, the opposing portions of the spacer members opposing to the round sectional portions at the time of moving to the adjusting position are coming into the inside of the outer diameter of the mixing wing portion of the screws in the aligning direction of the pair of screws and the drawing members intervening between the opposing portions s of both the spacer members are movable in the direction approaching to and retracting from the round sectional portions along the opposing portions. Therefore, it is possible to suppress the cross section of flow route formed around the round sectional portions to a small cross section. Consequently, it is possible to easily perform the extracting of the screws from the barrel, and provide the mixing degree adjusting device capable of obtaining the sufficient drawing effect.

Further, the opposing portions of the spacer members are formed in a substantially linear shape extending substantially in parallel with the orthogonal direction orthogonal to the aligning direction, and the drawing members are movable along the opposing portions. Therefore, even when the drawing members are moved, a change amount of a clearance formed between the drawing members on the outside of both the round sectional portions in the aligning direction is minute. Consequently, since the cross section of flow route is not radically changed even with moving the drawing members, it is possible to easily perform the fine-adjustment of the mixing degree.

Preferably, the retracting position is a position where the spacer members are retracted to the outside of the inner peripheral surface of the barrel, and the drawing members are retractable to a position where the end parts on the both round sectional portions side are on the outside of the inner peripheral surface of the barrel.

Preferably, the spacer members have concave portions opening in the direction that is substantially orthogonal to the orthogonal direction, the retracting position is a position where the concave portions open towards the round sectional portions, and the adjusting position is a position where a part other than the concave portions comes into the inside of the outer diameter of the mixing wing portion in the aligning direction.

According to the present invention, it is possible to provide the mixing degree adjusting device capable of obtaining the sufficient drawing effect.

Further preferably, the spacer members are formed in a substantially cylindrical shape extending in the substantially parallel direction to the orthogonal direction, and rotatable around an axis thereof, the opposing portions and the concave portions are provided at a position where the spacer members are aligned in the circumferential direction, and by rotation of the spacer members, the spacer members are switched between the adjusting position and the retracting position.

According to the present invention, it is possible to provide the mixing degree adjusting device capable of easily extracting the screws.

It should be noted that the "cylindrical shape" includes a hollow shape, and "capable of extracting the screws from the intermeshing type twin screw extruder" means having size so that the concave portions opposing to the round sectional portions do not disturb the passage of a maximum outer diameter part of the screws at the time of extracting the screws from the intermeshing type twin screw extruder. The above understandings are also applied to the following description.

In the other preferable configuration, the spacer members are movable along the substantially parallel direction to the orthogonal direction, the opposing portions and the concave portions are provided at a position where the spacer members are aligned in the orthogonal direction, and by movement of the spacer members in the substantially parallel direction to the orthogonal direction, the spacer members are switched between the adjusting position and the retracting position.

In the other preferable configuration, the spacer members are movable along the substantially parallel direction to the aligning direction, and by the movement of the spacer members in the substantially parallel direction to the aligning direction, the spacer members are switched between the adjusting position and the retracting position.

According to the present invention, since it is possible to provide switching means between the position for adjusting the mixing degree of the spacer members and the position for extracting the screws in the aligning direction, a degree of freedom to install the extruder in the orthogonal direction is increased.

Preferably, the opposing portions of the spacer members are provided with an inclined surface or a curved surface approaching to the round sectional portions from the upstream side of the screws to the downstream side.

By configuring the spacer members in such a way, a clearance between the round sectional portions and the opposing portions on the upstream side is widened. Therefore, it is possible to suppress generation of the dead space within the mixing degree adjusting device.

Preferably, the end parts of the drawing members on the both round sectional portions side are provided with an inclined surface or a curved surface approaching to the round sectional portions from the upstream side of the screws to the downstream side.

By configuring the end parts of the drawing members on the both round sectional portions side in such a way, the clearance between the round sectional portions and the drawing members on the upstream side is widened. Therefore, it is possible to suppress the generation of the dead space within the mixing degree adjusting device.

An intermeshing type twin screw extruder according to the present invention comprises a pair of screws provided with round sectional portions having a diameter that is smaller than an outer diameter of a mixing wing portion on the downstream side of the mixing wing portion for mixing an object to be mixed, a barrel within which the pair of screws are aligned, and the above mixing degree adjusting device provided at a position corresponding to the round sectional portions of the screws in the barrel.

INDUSTRIAL APPLICABILITY

The present invention can be used in a mixing degree adjusting device for intermeshing type twin screw extruder for mixing various resin compounds such as plastic and rubber.

The invention claimed is:

1. A mixing degree adjusting device for adjusting a mixing degree of an object to be mixed by regulating a flow rate of the object to be mixed that flows along round sectional portions, the mixing degree adjusting device being provided at a position corresponding to said round sectional portions in an intermeshing type twin screw extruder in which a pair of screws provided with said round sectional portions having a diameter that is smaller than an outer diameter of a mixing wing portion on a downstream side of the mixing wing portion for mixing the object to be mixed are aligned within a barrel, comprising:

a pair of spacer members arranged at a position sandwiching both said round sectional portions from both sides in an aligning direction of said pair of screws; and a pair of drawing members arranged as a position sandwiching both said round sectional portions from both sides in an orthogonal direction that is orthogonal to the aligning direction, said pair of spacer members being movable between an adjusting position for coming into an inside of the outer diameter of said mixing wing portion in the aligning direction and opposing to the round sectional portions, and a retracting position, when said screws are extracted from the barrel, for retracting to the outside until the passage of said screws are accepted, and opposing portions opposing to said round sectional portions at the time of moving to the adjusting position being formed in a substantially linear shape extending substantially in parallel with the orthogonal direction seen from an axial direction of said screws, and said pair of drawing members being formed in a shape in which end parts thereof on both of the round sectional portions side are along peripheral surfaces of said round sectional portions, movable in the direction approaching to and retracting from said round sectional portions along said opposing portions in an area intervening between said opposing portions of both said pair of spacer members at the time of moving to the adjusting position, and when said screws are extracted from said barrel, retractable to the outside until the passage of said screws is accepted.

2. The mixing degree adjusting device according to claim 1, wherein the retracting position is a position where said pair of spacer members are retracted to an outside of an inner peripheral surface of said barrel, and said drawing members are retractable to a position where the end parts on the both round sectional portions side are on the outside of the inner peripheral surface of said barrel.

3. The mixing degree adjusting device according to claim 1, wherein said pair of spacer members have concave portions opening in a direction that is substantially orthogonal to the orthogonal direction, the retracting position is a position where said concave portions open towards said round sectional portions, and the adjusting position is a position where a part other than said concave portions come into the inside of the outer diameter of said mixing wing portion in the aligning direction.

4. The mixing degree adjusting device according to claim 3, wherein said pair of spacer members are formed in a substantially cylindrical shape extending in a substantially parallel direction to the orthogonal direction, and rotatable around an axis thereof, said opposing portions and said concave portions are provided at a position where said pair of spacer members are aligned in a circumferential direction, and by rotation of said pair of spacer members, said pair of spacer members are switched between the adjusting position and the retracting position.

5. The mixing degree adjusting device according to claim 3, wherein said pair of spacer members are movable along the substantially parallel direction to the orthogonal direction, said opposing portions and said concave portions are provided at a position where said pair of spacer members are aligned in the orthogonal direction, and by movement of said pair of spacer members in the substantially parallel direction to the orthogonal direction, said pair of spacer members are switched between the adjusting position and the retracting position.

6. The mixing degree adjusting device according to claim 1, wherein said pair of spacer members are movable along the substantially parallel direction to the aligning direction, and by the movement of said pair of spacer members in the substantially parallel direction to the aligning direction, said pair of spacer members are switched between the adjusting position and the retracting position.

7. The mixing degree adjusting device according to claim 1, wherein said opposing portions of said pair of spacer members are provided with an inclined surface or a curved surface approaching to said round sectional portions from an upstream side of said screws to the downstream side.

8. The mixing degree adjusting device according to claim 1, wherein the end parts of said drawing members on both the round sectional portions side are provided with an inclined surface or a curved surface approaching to said round sectional portions from an upstream side of said screws to the downstream side.

9. An intermeshing type twin screw extruder, comprising:
a pair of screws provided with round sectional portions having a diameter that is smaller than an outer diameter of a mixing wing portion on the downstream side of the mixing wing portion for mixing an object to be mixed;
a barrel within which the pair of screws are aligned; and
the mixing degree adjusting device according to claim 1 provided at a position corresponding to said round sectional portions of said pair of screws in the barrel.

* * * * *